United States Patent
Kushita

[11] Patent Number: 5,872,518
[45] Date of Patent: Feb. 16, 1999

[54] WIRELESS SELECTIVE CALLING RECEIVER WITH A METHOD AND A SYSTEM FOR RELEASING A FREQUENCY CHANNEL LOCK

[75] Inventor: Masayuki Kushita, Tokyo, Japan

[73] Assignee: NEC Corporation, Tokyo, Japan

[21] Appl. No.: 740,222

[22] Filed: Oct. 25, 1996

[30] Foreign Application Priority Data

Oct. 26, 1995 [JP] Japan ................................ 7-278982

[51] Int. Cl.$^6$ .......................... H01H 67/00; G08B 5/22
[52] U.S. Cl. .................... 340/825.03; 455/32.1; 340/825.21; 340/825.44
[58] Field of Search ................ 340/825.03, 825.14, 340/825.2, 825.21, 825.44; 455/32.1

[56] References Cited

U.S. PATENT DOCUMENTS

| | | |
|---|---|---|
| 4,914,649 | 4/1990 | Schwendeman et al. ............ 455/32.1 |
| 5,206,855 | 4/1993 | Schwendeman et al. ............ 455/32.1 |
| 5,262,769 | 11/1993 | Holmes .............................. 340/825.03 |
| 5,497,508 | 3/1996 | George .................................. 455/32.1 |
| 5,525,974 | 6/1996 | Matai ................................. 340/825.21 |
| 5,596,315 | 1/1997 | Olds et al. ........................ 340/825.03 |

FOREIGN PATENT DOCUMENTS 4-207234   7/1992   Japan .

Primary Examiner—Michael Horabik
Assistant Examiner—Edward Merz
Attorney, Agent, or Firm—Scully, Scott, Murphy & Presser

[57] ABSTRACT

A wireless selective calling receiver performs an intermittent receiving operation in a channel lock state. The channel lock is canceled when a detected network information is judged to be different from the network information of the self receiver for a predetermined consecutive number of times. The channel lock is also canceled when such judgement is made and the detected network information remains the same at the time of the judgement.

41 Claims, 18 Drawing Sheets

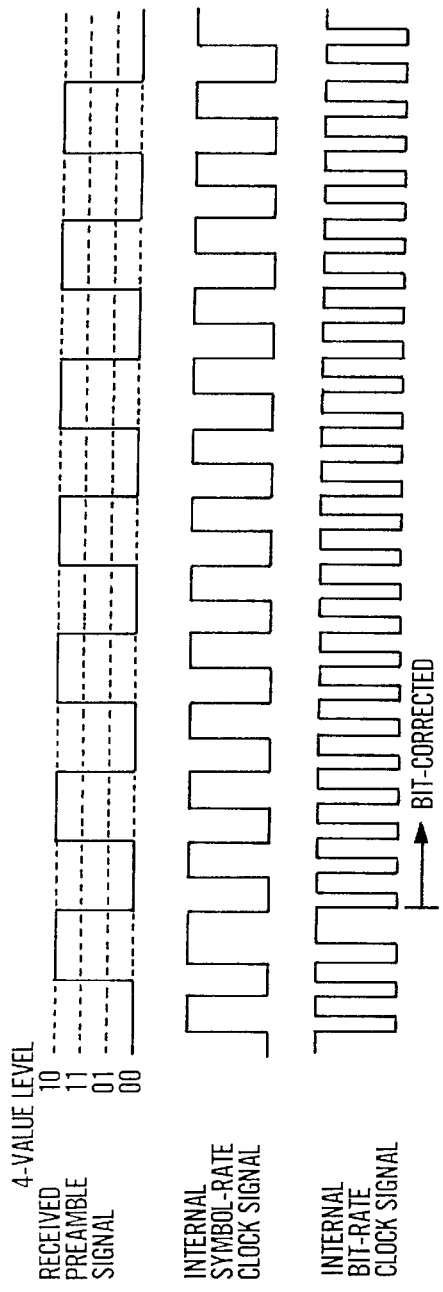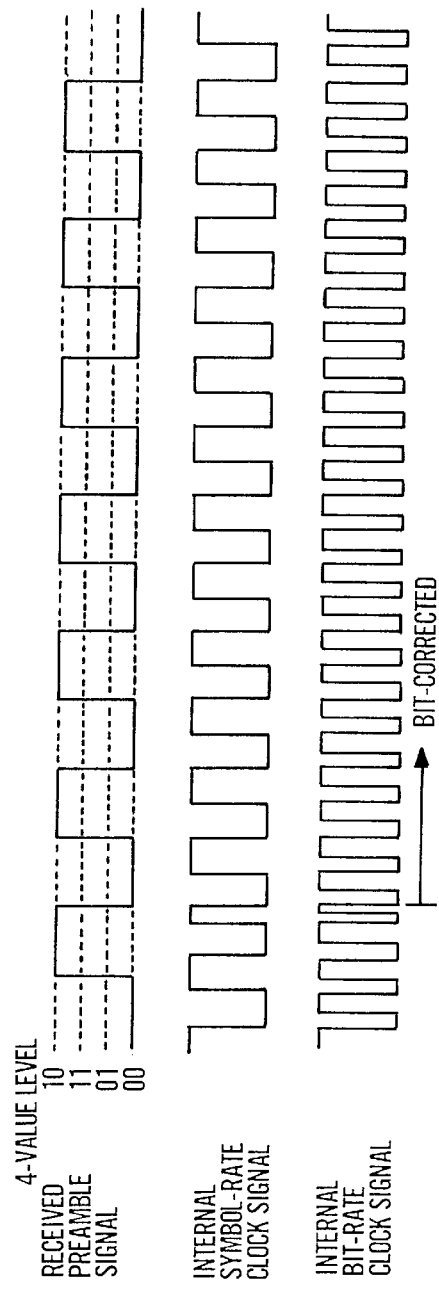

WIRELESS SELECTIVE CALLING RECEIVER WITH A METHOD AND A SYSTEM FOR RELEASING A FREQUENCY CHANNEL LOCK

BACKGROUND OF THE INVENTION

1. Field of the Invention

The present invention relates to a wireless selective calling receiver and, more specifically, to a wireless selective calling receiver which performs an intermittent receiving operation by selecting one of a plurality of receiving channels.

2. Description of the Related Art

A conventional wireless selective calling receiver performs intermittent receiving as shown in a process flow of FIG. 1. Specifically, after the power-on, a sync state flag SYNC and a channel control flag LOCK are initialized (step F1). Until a frame sync signal and a frame information signal (which can be subjected to error detection and correction) are detected normally, an intermittent receiving operation is performed while the receiving frequency is sequentially switched at given intervals (hereinafter referred to as "channel scanning") for pulling into synchronization (step F2). once a frame sync signal and a frame information signal are detected normally (steps F3, F5, and F6), an intermittent receiving operation is performed (step F102), together with channel scanning, in which reception is effected only at a predetermined frame position on each channel until network information (only the area information in FIG. 1) of the self receiver is detected (steps F12 and F13). If the network information of the self receiver is detected (Yes at step F13), the receiving frequency is fixed at the frequency of a network-information-detected channel (hereinafter referred to as "channel lock"; step F103). Subsequently, an intermittent receiving operation in which reception is effected at a predetermined frame position only on the fixed channel is performed (step F104).

However, in the above conventional technique, as shown in the process flow of FIG. 1, if the network information (only the area information in FIG. 1) of the self receiver is not detected (No at step F13) even once during the intermittent receiving operation in the channel lock state (step F104), the channel lock is canceled (step F101) and an intermittent receiving operation also comes to involve the other channels (step F102).

Therefore, there is a possibility that when the sensitivity of the receiver falls due to sudden occurrence of noise or temporary entrance into an area of poor reception of radio waves, a network information signal in which errors have occurred at more than an error detectable or correctable number of bits to become another correct code is received as if it were a correct signal. Even in this case, if the value of the received network information is found different even only once from the network information of the self receiver as a result of their comparison, the channel lock is canceled to start scanning the other channels. This is a factor of shortening the battery life. In addition, this may cause a problem that should locking be made to another channel erroneously (for instance, due to accidental conversion into incorrect reception data) while the other channels are scanned, it is no longer possible to receive data on the network channel of the self receiver.

In recent years, as one measure to accommodate the increasing transmission rate in the wireless selective calling signal scheme, a transmission technique of modulating and transmitting a 4-value signal comes to be employed instead of the previous signal scheme in which a 2-value signal is modulated and transmitted. Even in this scheme of transmitting a 4-value signal, each of a preamble signal that is used to detect an intermediate level of a signal and to take bit synchronization and a frame sync signal that is used to take frame synchronization is constituted of the lowest and highest levels of the four values, and hence is substantially equivalent to a 2-value signal. Therefore, in a situation that the sensitivity of the receiver is not high, during the channel lock, it is likely that although a frame sync signal is detected, ensuing network information and frame information, which are in four values, are detected erroneously (or as incorrect information caused by accidental conversion).

SUMMARY OF THE INVENTION

An object of the present invention is to provide a receiving method which is able to prevent call losses and a waste of battery current which are caused by easy cancellation of the channel lock.

Another object of the present invention is to provide a method of releasing a frequency channel lock so as to prevent easy cancellation of the channel lock.

Still another object of the present invention is to provide a wireless selective calling receiver which is able to achieve reliable communications without wasting the battery energy even when the sensitivity of the receiver falls suddenly for a short time.

According to the invention, during an intermittent receiving operation in a channel lock state, the channel lock is not released until the number of consecutive non-coincidences of a predetermined service identifier and a detected signal corresponding to the predetermined service identifier reaches a predetermined value or until the number of consecutive non-coincidences with the detected signal remaining the same value reaches the predetermined value.

The wireless selective calling receiver intermittently receives a transmission signal by selecting one of a plurality of frequency channels. A base station transmits the transmission signal on a plurality of frequency channels in synchronous or asynchronous transmission. The transmission signal has service identifying information including a service identifier at a predetermined position the transmission signal.

A method is comprised of: a) storing the service identifying information including the service identifier; b) comparing a detected signal which is detected from the predetermined position of each of received signals with the service identifier stored; c) counting a number of consecutive non-coincidences of the service identifier and detected signals which are detected from the predetermined position of consecutively received signals to produce a non-coincidence count; and d) releasing the frequency channel lock when the non-coincidence count reaches a predetermined value.

It is preferable that the service identifying information comprises a plurality of service identifiers at predetermined positions of the transmission signal, respectively, and predetermined values corresponding to each of the service identifiers are stored, wherein the step (c) counts a number of consecutive non-coincidences of each of the service identifiers and detected signals which are detected from the predetermined position of consecutively received signals to produce non-coincidence counts corresponding to the service identifiers, respectively, and the step (d) releases the frequency channel lock when at least one of the non-coincidence counts reaches a predetermined value.

Further preferably, the detected signal is compared with a preceding detected signal which was detected from the predetermined position of a preceding received signal, and consecutive coincidences of the detected signal and the preceding detected signal are detected, wherein the step (c) counts a number of consecutive non-coincidences of the service identifier and detected signals which are detected from the predetermined position of consecutively received signals with the detected signals remaining the same to produce the non-coincidence count.

In the invention, during an intermittent receiving operation in a channel lock state, the channel lock is canceled when network information is detected normally and it is judged different from the network information of the self receiver consecutively at a predetermined number of times, or when network information is detected normally, it is judged different from the network information of the self receiver consecutively at the predetermined number of times, and the received network information remains the same value while such judgments are made. Therefore, the channel lock is not canceled easily.

BRIEF DESCRIPTION OF THE DRAWINGS

FIG. 5A is a timing chart showing an example of bit correction using a preamble signal in a case where the phase of an internal symbol-rate clock signal is advanced from the transmitted signal by ¼ of the symbol width;

FIG. 5B is a timing chart showing an example of bit correction using a preamble signal in a case where the phase of an internal symbol-rate clock signal is delayed the transmitted signal by ¼ of the symbol width;

DESCRIPTION OF THE PREFERRED EMBODIMENTS

Figure 1:
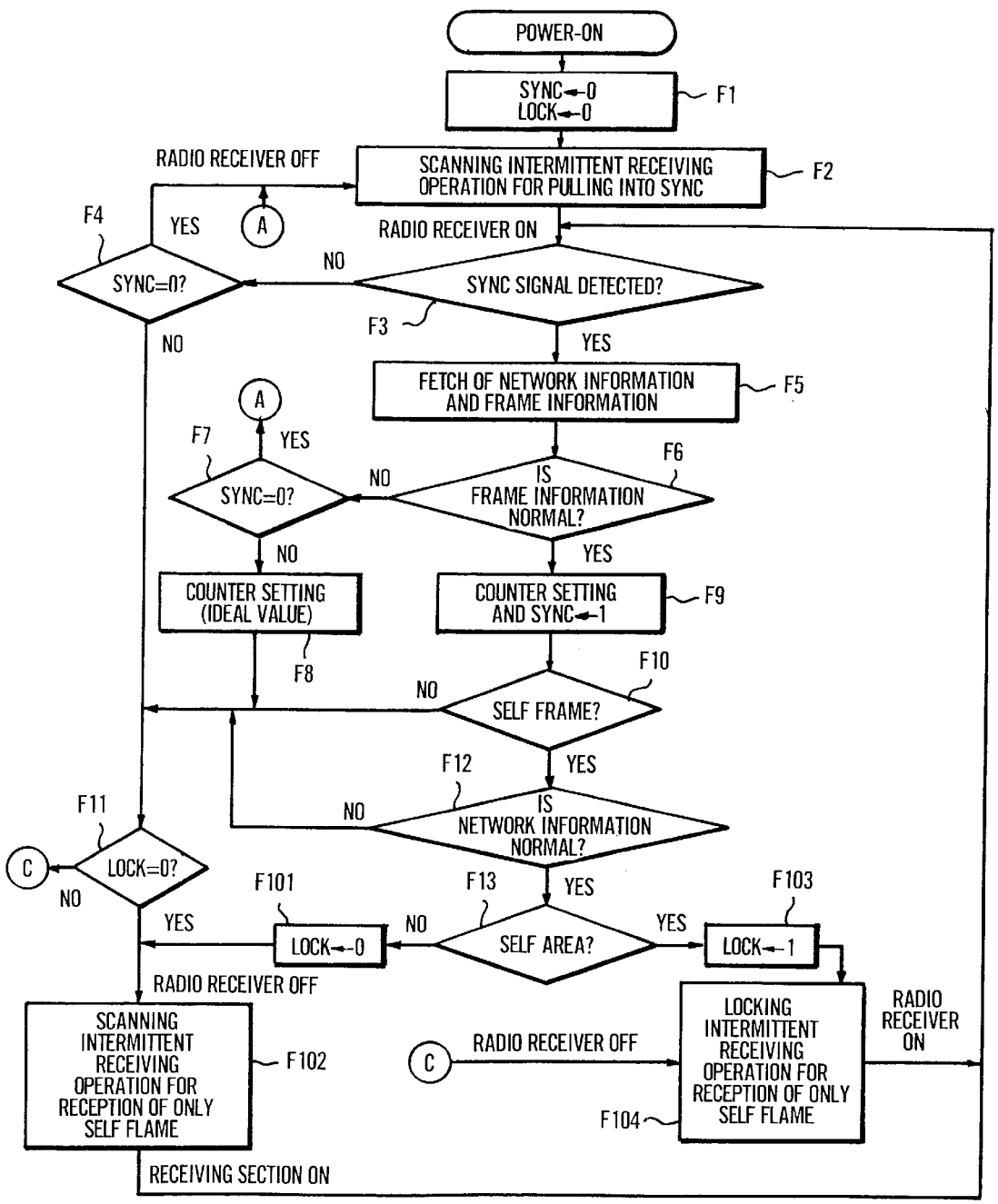
FIG. 1 is a flowchart showing an example of a conventional process flow.
Figure 2:
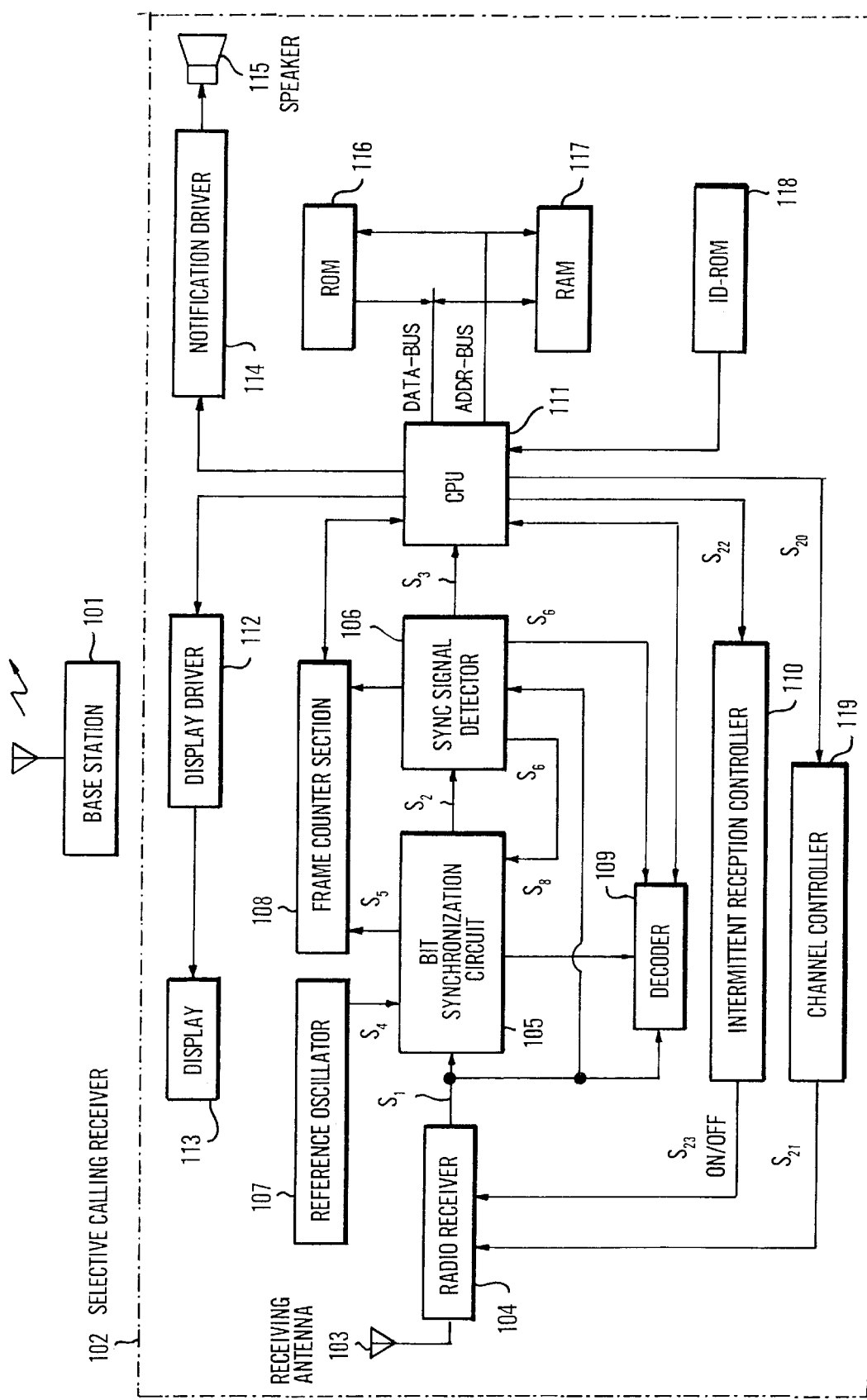
FIG. 2 is a block diagram showing an example of a wireless selective calling receiver to implement the present invention.

Referring to FIG. 2, a base station 101 sends a transmission signal of a given format (see FIG. 4) to a selective calling receiver 102 which receives the transmission signal at a receiving antenna 103. A received signal is input to a radio receiver 104 which amplifies, demodulates, and waveform-shapes the received signal, and outputs a received and demodulated signal $S_1$ to a bit synchronization circuit 105, a sync signal detector 106, and a decoder 109. Whether the radio receiver 104 should operate is determined based on a signal $S_{12}$ that is supplied from an intermittent reception controller 110, and the receiving frequency (or channel) switching during operation of the radio receiver 104 is performed based on a signal $S_{21}$ that is supplied from a channel controller 119. The intermittent reception controller 110 and the channel controller 119 are controlled through control signals $S_{11}$ and $S_{20}$, respectively, which are generated by a processor (CPU) 111.

The bit synchronization circuit 105 generates a bit-rate clock signal and a symbol-rate clock signal by frequency-dividing a clock signal $S_4$ that is supplied from a reference oscillator 107. During operation of the radio receiver 104, the bit synchronization circuit 105 adjusts, when necessary, the phases of the generated clock signals so that they are in synchronization with the phase of the received signal $S_1$ by using the preamble signal and other signals of the received signal. This adjustment is hereinafter called "bit correction", which will be shown in FIG. 5. Resulting bit-corrected signals indicated by reference $S_2$ and $S_8$ are output to both the sync signal detector 106 and the decoder 109.

The sync signal detector 106 cuts out a bit sequence from the received signal $S_1$ by using the bit-corrected clock signals $S_2$ that are supplied from the bit synchronization circuit 105, and detects a frame sync signal from the bit sequence which will be described in FIG. 6.

Upon detection of the frame sync signal, the sync signal detector 106 outputs a sync signal detection signal $S_6$ (see FIG. 6) to the bit synchronization circuit 105, a frame counter section 108, and the decoder 109, and also generates an interruption $S_3$ of sync signal detection to the CPU 111. Upon reception of the sync signal detection signal $S_6$, the bit synchronization circuit 105 generates a first-bit signal $S_5$ in which a pulse of 1-bit width occurs at the head of each word (=30 bits) at the timing as shown in FIG. 6, and supplies it to the frame counter section 108.

The decoder 109 receives, from the CPU 111, a self calling number that is previously stored in an ID-ROM 118. After receiving the sync signal detection signal $S_6$, the decoder 109 cuts out a bit sequence from the received signal $S_1$ coming from the radio receiver 104 by using the bit-corrected clock signals $S_8$ that are supplied from the bit synchronization circuit 105, and performs an error detection and correction operation on the bit sequence on a word-by-word basis (1 word=30 bits). In processing reception data having an ID number code and a message code (see FIG. 4), the decoder 109 performs, in addition to the error detection and correction, detection of a self calling number that is received from the CPU 111 and detection of a fixed pattern such as a message termination signal from the received signal $S_1$. Further, the decoder 109 outputs, to the CPU 111, an error detection result and error-corrected data (information bit), and detection results of the self calling number and the fixed pattern. The CPU 111 includes at least one counter (not shown) for counting the number of times non-coincidence of network information included in a received signal occurs, as described later.

The CPU 111 fetches a program that is previously stored in a ROM 116 via an address bus and a data bus, and operates according to the program while using a RAM 117.

Figure 3:
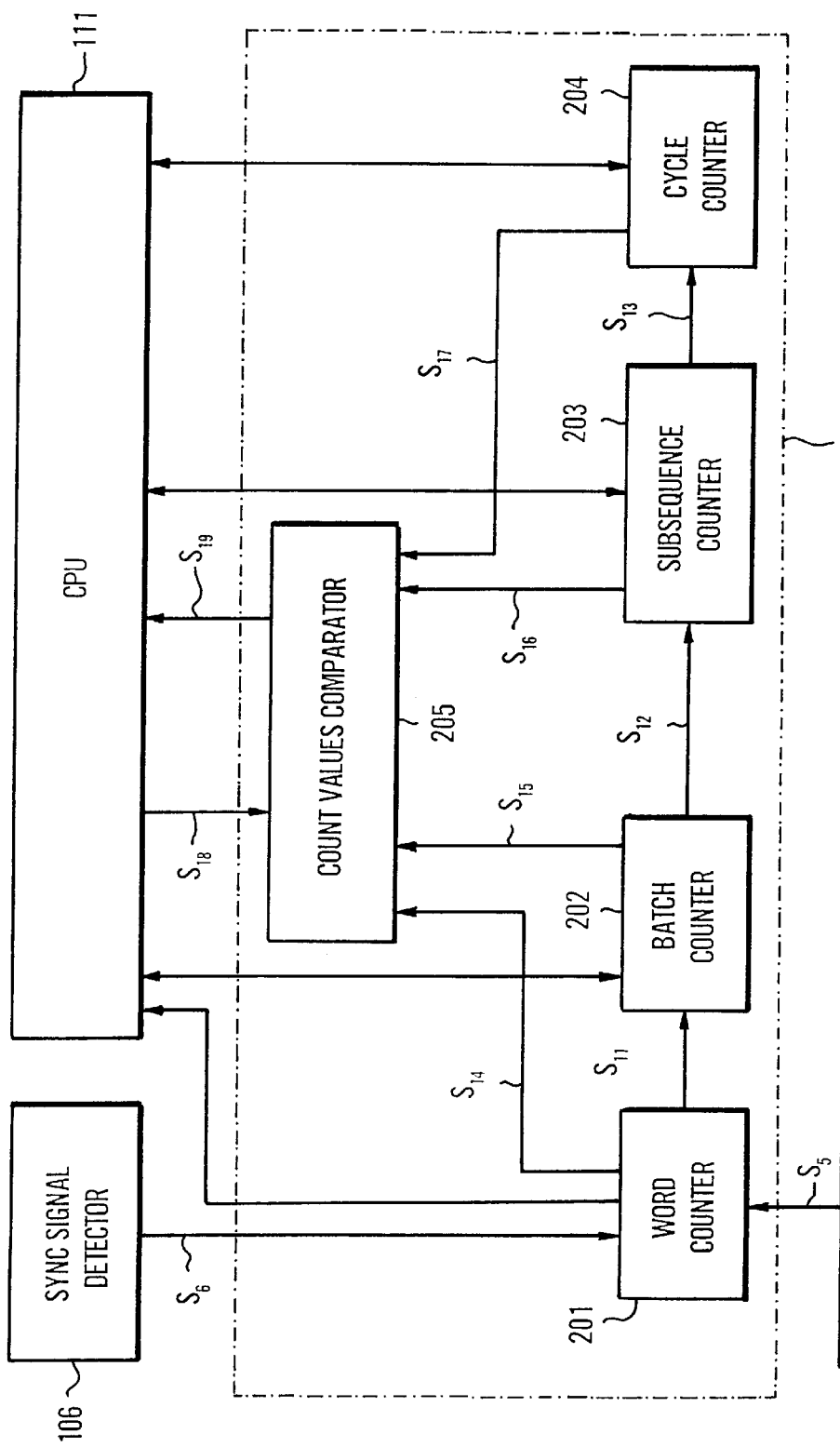
FIG. 3 is a block diagram showing an internal configuration of an example of a frame counter section used in the wireless selective calling receiver of FIG. 2.
Figure 4:
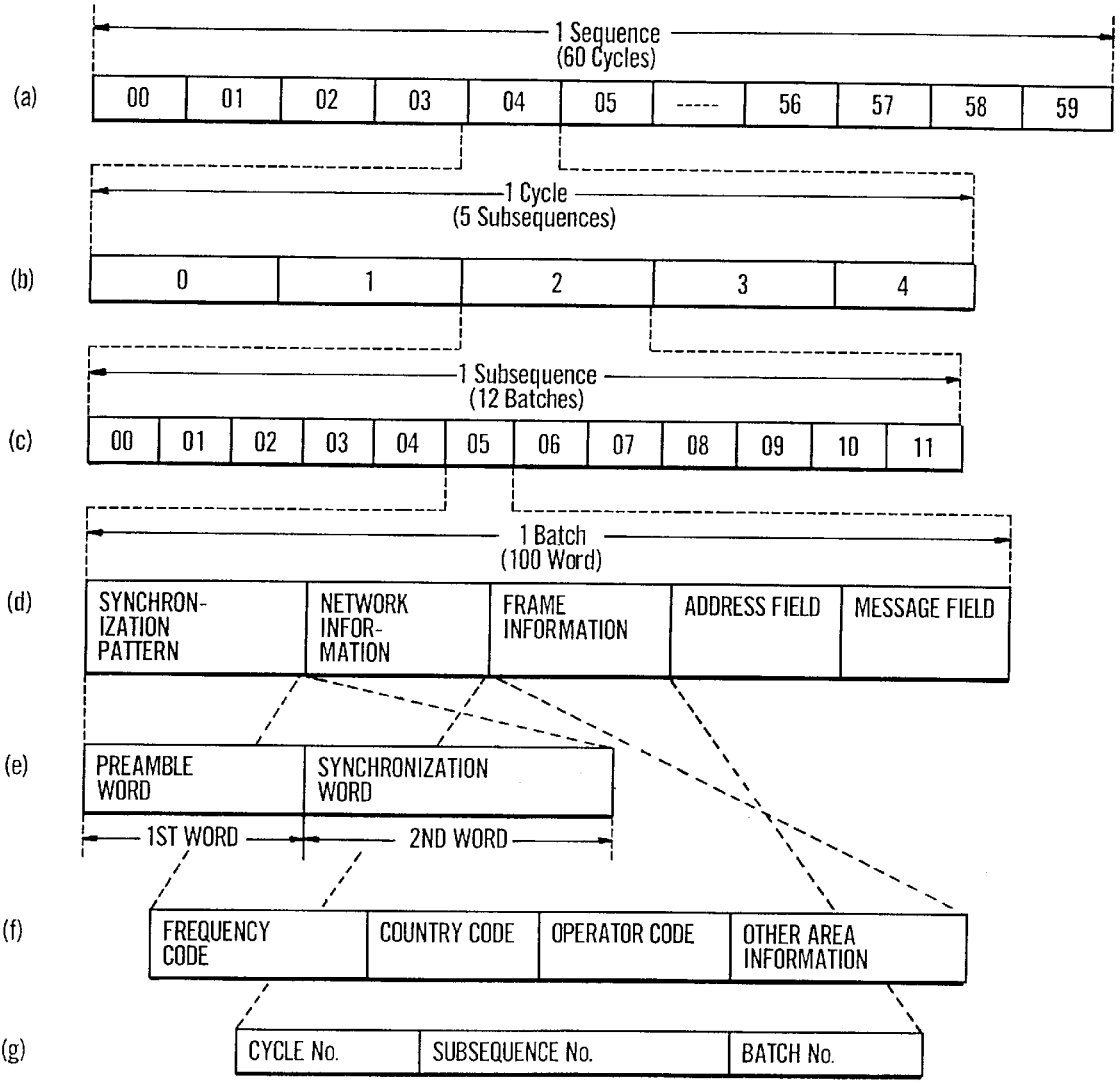
FIG. 4 shows an example of a format of a synchronization signal scheme for a signal to be received by the wireless selective calling receiver of the invention.

Referring to FIG. 3, the frame counter section 108 is comprised of a word counter 201, a batch counter 202, a subsequence counter 203, and a cycle counter 204 which are to count the respective numbers of words, batches, subsequences, and cycles as shown in FIG. 4, and further a comparator 205 which compares the respective count values of these counters with values preset by the CPU 111 through a signal $S_{18}$ and outputs the comparison result to the CPU 111 through a signal $S_{19}$.

In the cases of the signal format as shown in FIG. 4, these counters operate as follows. The word counter 201 increments according to the first-bit pulse signal $S_5$ received from the bit synchronization circuit 105. When the word count value reaches 99, it is returned to 0 upon reception of the next pulse of the first-bit pulse signal $S_5$. The batch counter 202 counts up in response to a pulse $S_{11}$ that is generated when the count of the word counter 201 returns from 99 to 0. When the count of the batch counter 202 reaches 11, it is returned to 0 upon reception of the next pulse. The subsequence counter 203 counts up in response to a pulse $S_{12}$ that is generated when the count of the batch counter 202 returns from 11 to 0. When the count of the subsequence counter 203 reaches 4, it is returned to 0 upon reception of the next pulse. Further, the cycle counter 204 counts up in response to a pulse $S_{13}$ that is generated when the count of the subsequence counter 203 returns from 4 to 0. When the count of the cycle counter 204 reaches 59, it is returned to 0 upon reception of the next pulse.

Referring to FIG. 4, the base station 101 transmits a transmission signal having the following format through a plurality of frequency channels in synchronization. One sequence consists of 60 cycles each cycle consisting of 5 subsequences, which are shown in (a) and (b) of the figure. Each subsequence consists of 12 batches each batch consisting of 100 words, which are shown in (c) and (d) of the figure. Each batch includes a synchronization pattern, network information, frame information, an address field, and a message field. The synchronization pattern includes a preamble word and a synchronization word as shown in (e) of the figure.

The network information includes several service identifiers comprising a frequency code, a country code, an operator code, and other area information as shown in (f) of the figure. These service identifiers are previously stored in the ID-ROM 118 to be compared with service identifiers detected from a received signal. For example, the frequency code identifies at least one frequency to be used. The country code identifies a country in which the receiver is usable. The operator code identifies a specified common carrier or communication company. The other area information identifies an smaller area in which the receiver is usable.

Figure 9:
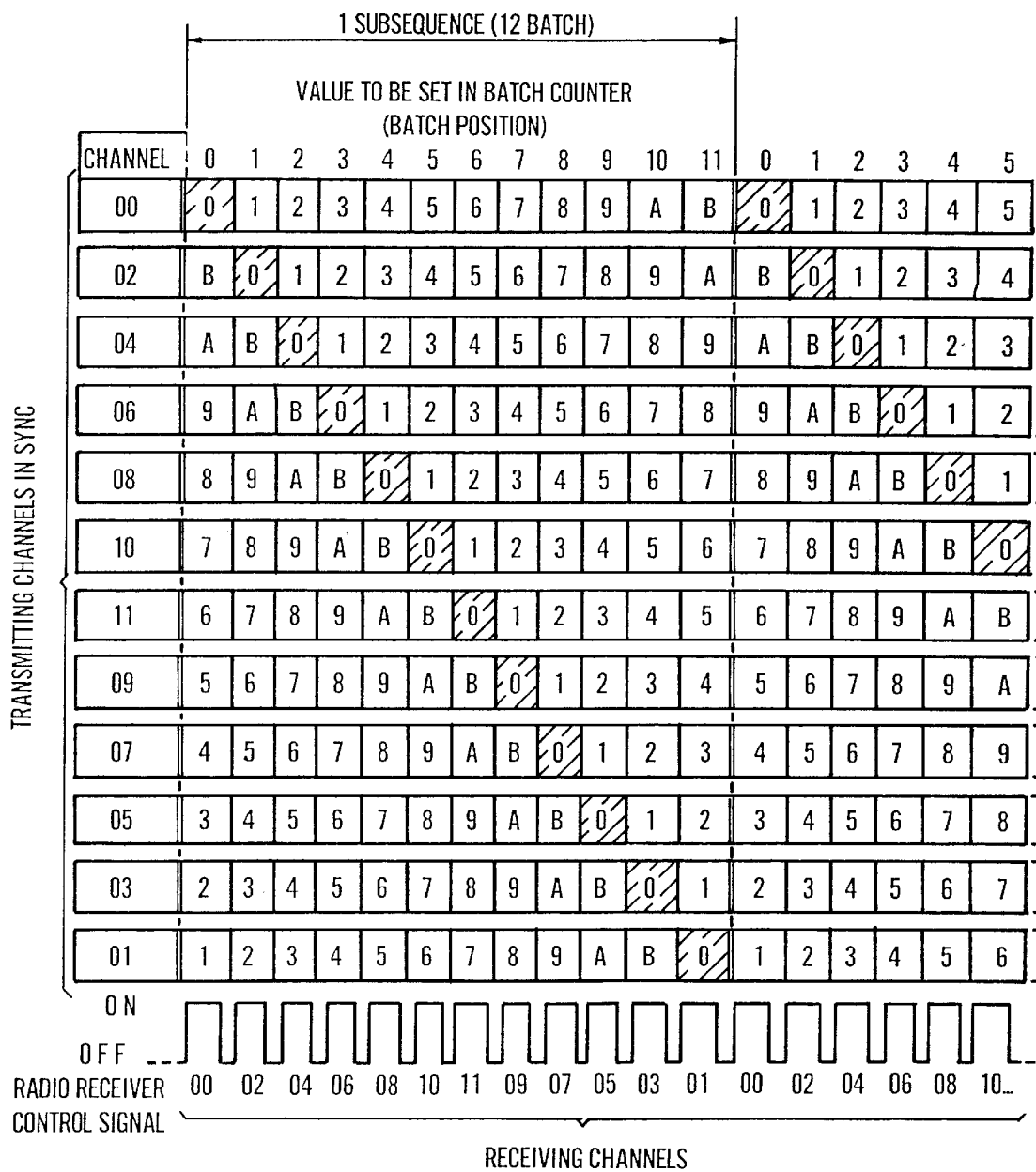
FIG. 9 is a timing chart showing an example of a second scanning intermittent receiving operation for reception of only the frame to be received on each channel in a case where signals according to the format of FIG. 4 are transmitted on a plurality of channels in a synchronization manner.

The frame information consists of a cycle number, a subsequence number, and a batch number as shown in (g) of the figure. Such a transmission signal is transmitted through each of frequency channels in synchronization as shown in FIG. 9.

Referring to FIGS. 5A and 5B, the bit synchronization circuit 105 performs the bit correction of the internal symbol-rate clock signal and the internal bit-rate clock signal by using the preamble word and the synchronization word of the received signal. FIG. 5A shows a case where the phase of an internal symbol-rate clock signal is advanced from a transmitted signal by ¼ of the symbol width, and FIG. 5B shows a case where the former is delayed from the latter by ¼ of the symbol width.

Figure 6:
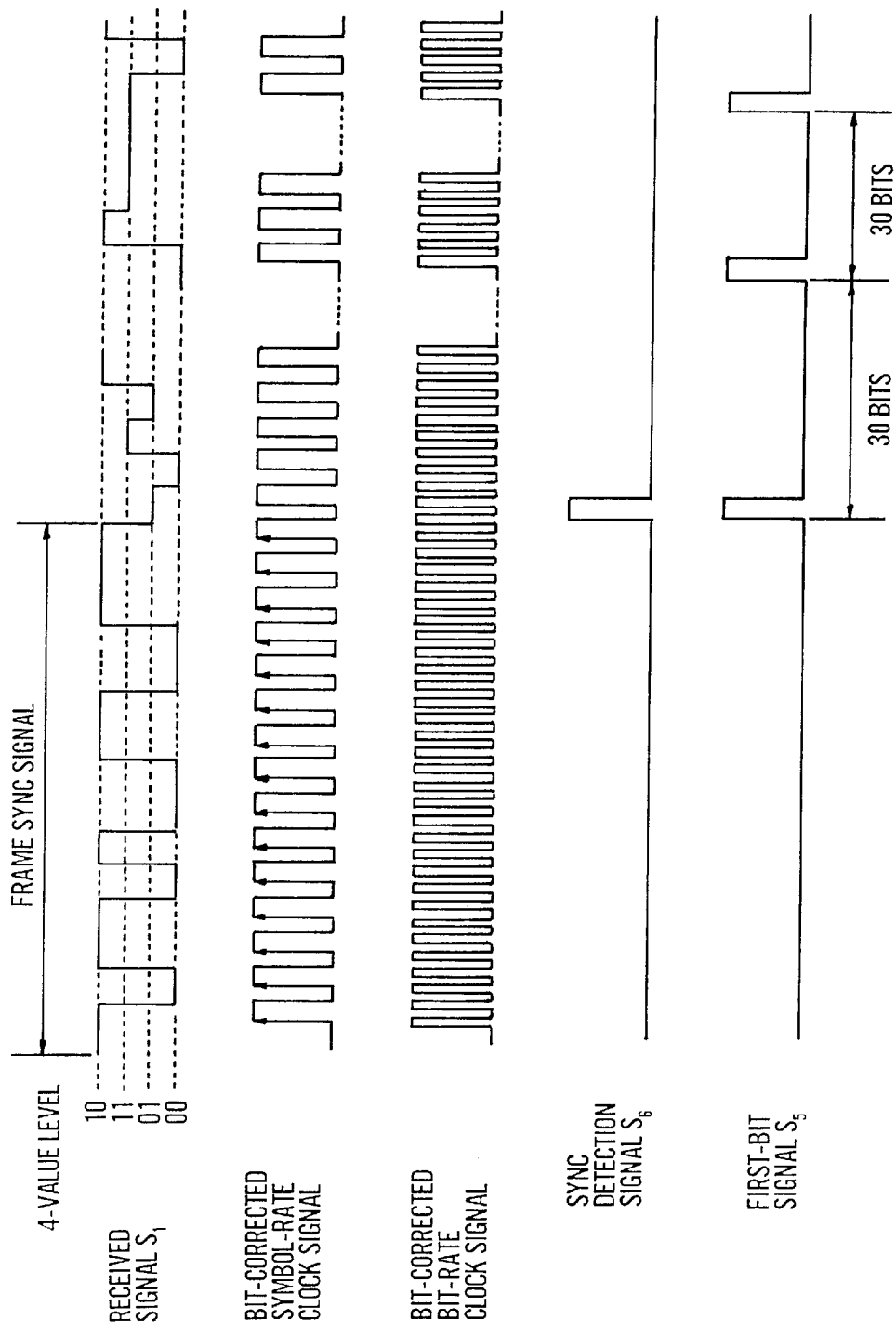
FIG. 6 is a timing chart showing an example of signals in the receiver before and after detection of a frame sync signal.

Referring to FIG. 6, the sync signal detector 106 detects the sync detection signal $S_6$ based on the bit-corrected clock signals and the bit synchronization circuit 105 generates the first-bit signal $S_5$ based on the sync detection signal $S_6$.

As described before, the CPU 111 fetches the program from the ROM 116, and then performs the receiving operations according to the program. The main contents of the program for receiving the transmission signal conforming to the signal format shown in FIG. 4 on a plurality of channels in a synchronization manner as shown in FIG. 9, will be described below.

1) First Channel-Scanning Intermittent Receiving

During a pulling-into-synchronization operation from the power-on to the establishment of frame synchronization, the CPU 111 controls the channel controller 119 and the intermittent reception controller 110 at the given timing that is written in the ROM 116 to cause the radio receiver 104 to perform the following first scanning intermittent receiving operation.

Figure 7:
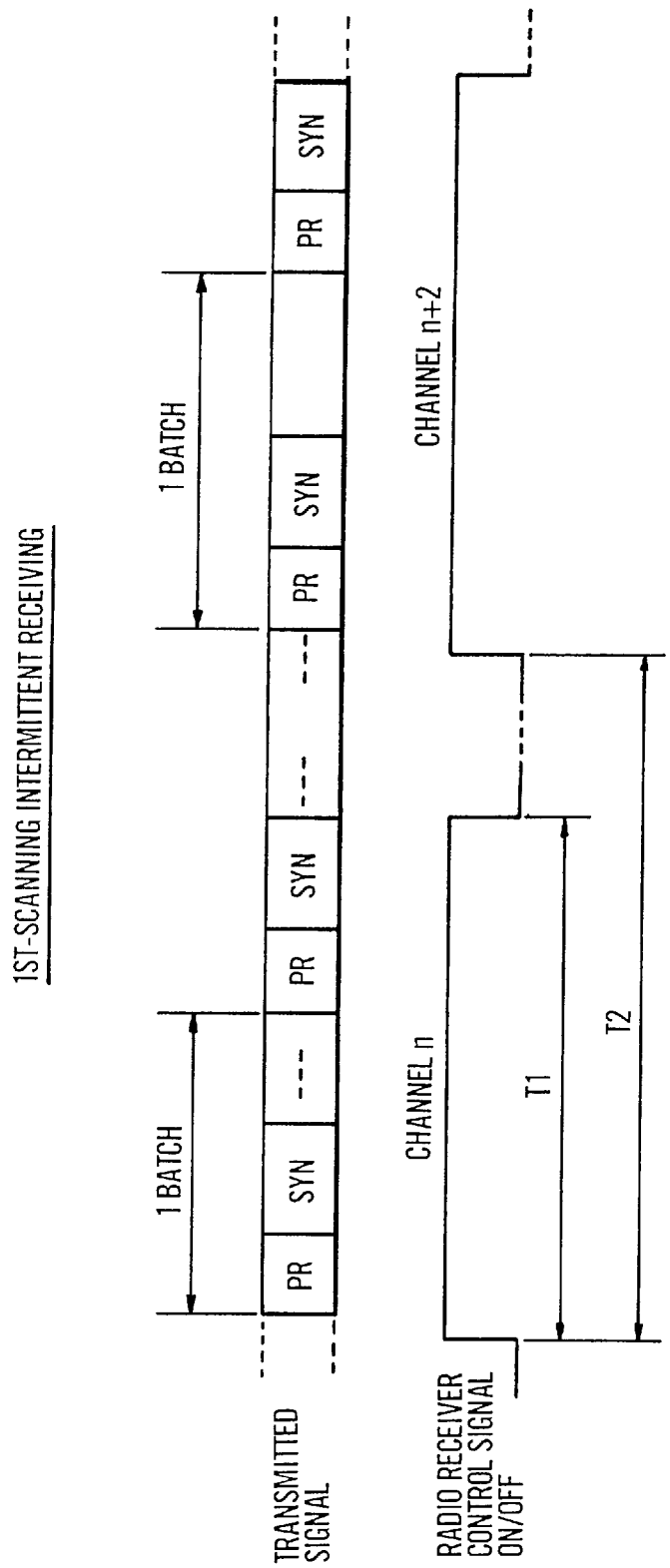
FIG. 7 is a timing chart showing an example of a first scanning intermittent receiving operation for pulling into synchronization.

Referring to FIG. 7, the CPU 111 causes the radio receiver 104 to become receivable during a period T1 which is long enough to detect sync signals twice and includes a setup time for the boot-up of the radio receiver 104, and to repeat the above operation at a predetermined cycle T2 while scanning the receiving channels.

When the CPU 111 receives an interruption of sync signal detection while the radio receiver 104 performing the first scanning intermittent receiving operation, it then receives data relating to the network information and the frame information of the received signal from the decoder 109.

Figure 8:
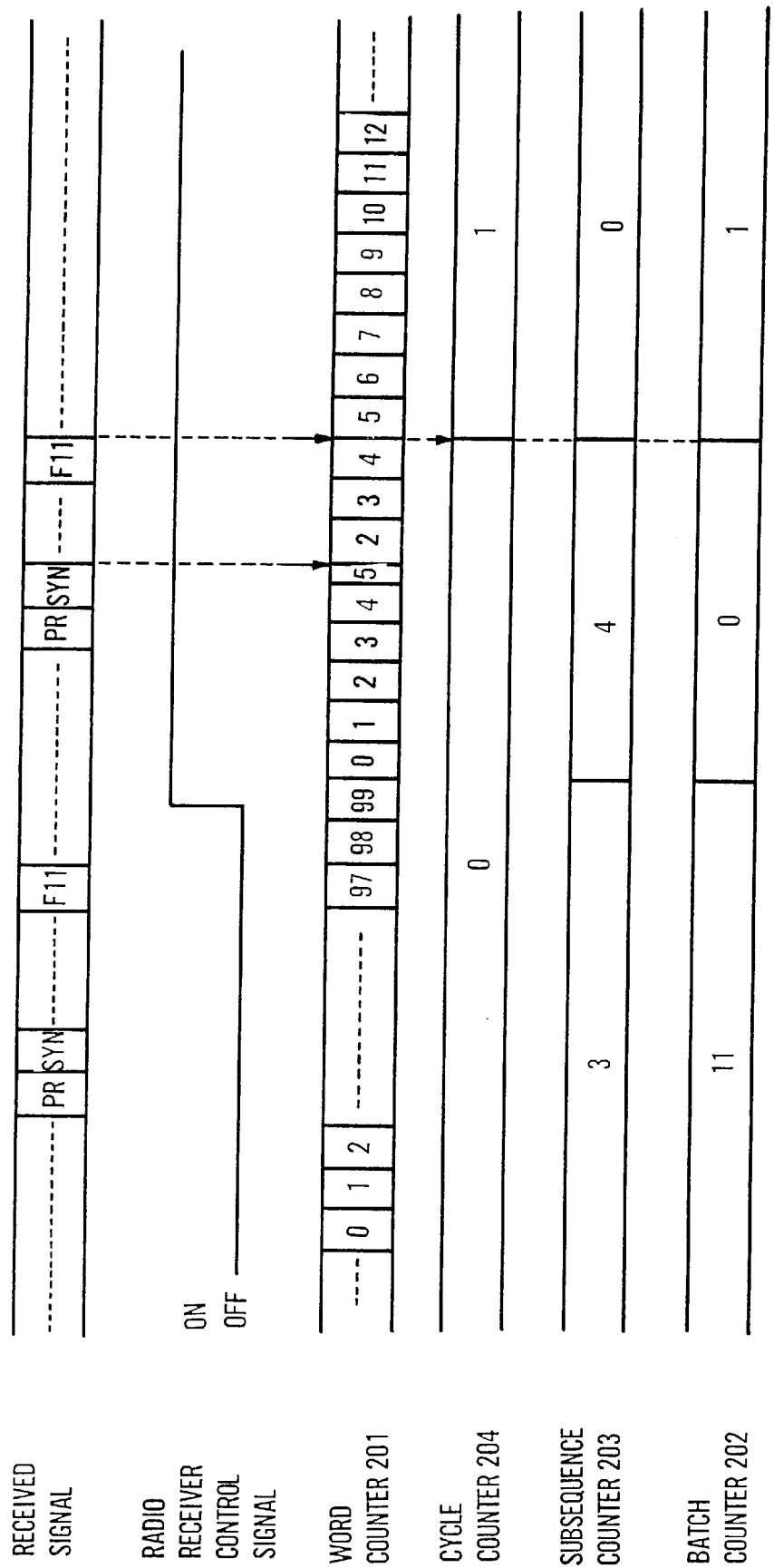
FIG. 8 is a timing chart showing an example of an operation for synchronization the internal frame counter section with the received frame by receiving frame information following the frame sync signal in a case where the frame counter is out of synchronization with the received frame.

If there is no problem in the error detection result of the frame information received from the decoder 109, the CPU 111 performs a range check on the frame information. If there is no problem again, the CPU 111 sets the frame counter section 108 based on the frame information concerned as shown in FIG. 8, which shows an example of an operation for synchronizing the internal frame counter section with the received frame by receiving frame information following the frame sync signal in a case where the frame counter is out of synchronization with the received frame.

Further, the CPU 111 compares the received frame information with the value of the frame to be received by the self receiver which is previously set in the ID-ROM 118, to check whether they are identical. If there is no problem in the received error detection result of the network information, the CPU 111 further compares it with the network value of the self receiver which is previously set in the ID-ROM 118, to check whether they are identical.

2) Second Channel-Scanning Intermittent Receiving

If non-coincidence is found in either of the respective comparison results of the frame information and the network information as described above, the CPU 111 causes the radio receiver 104 to perform a second scanning intermittent receiving operation.

Referring to FIG. 9, the second scanning intermittent receiving operation is performed by the CPU 111 controlling the channel controller 119 and the intermittent reception circuit 110 to receive only the frame to be received by the self receiver which is set in the ID-ROM 118 for each channel as shown in FIG. 9 while scanning the channels.

3) Channel-Locking Intermittent Receiving

If both of the respective comparison results of the frame information and the network information as described above show coincidence, the CPU 111 causes the radio receiver 104 to perform a locking intermittent receiving operation.

Figure 10:
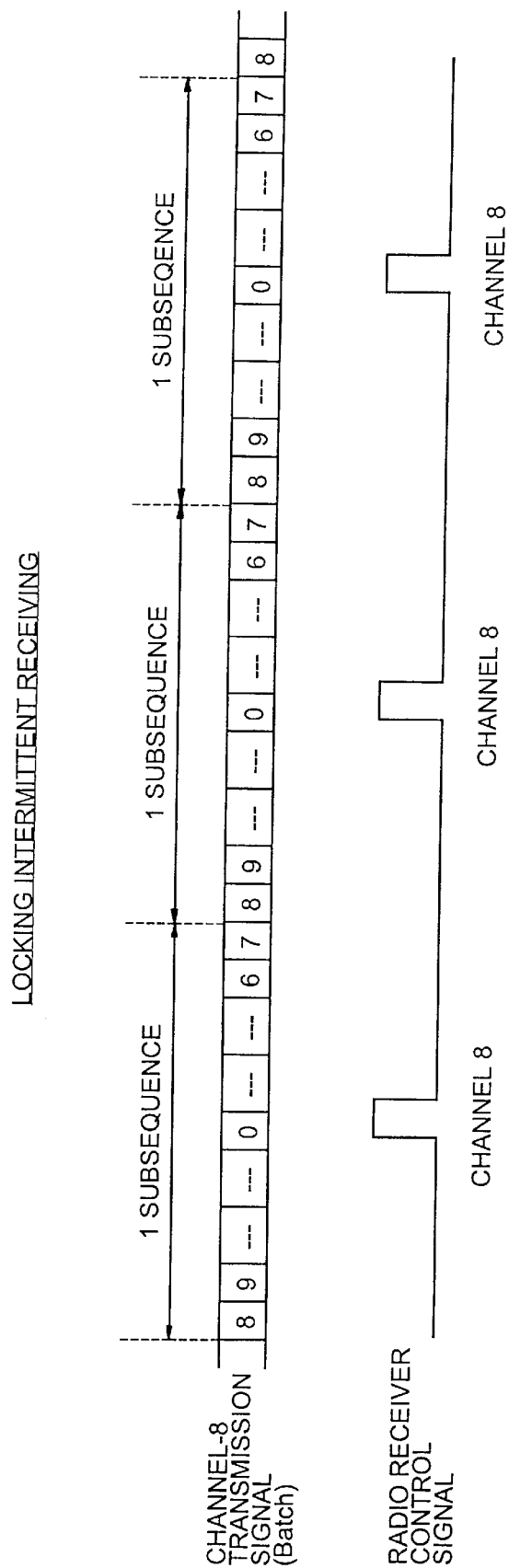
FIG. 10 is a timing chart showing an example of a locking intermittent receiving operation for reception of only the frame to be received on a fixed receiving channel.

Referring to FIG. 10, the locking intermittent receiving operation is performed by the CPU 111 controlling the channel controller 119 to fix the receiving frequency to the frequency of a channel on which the above data have been received and controlling the intermittent reception controller 110 to receive only the frame to be received by the self receiver which is set in the ID-ROM 118.

While the CPU 111 is causing the radio receiver 104 to perform the second scanning or locking intermittent operation mentioned above, it reads the information of the frame to be received which is set in the ID-ROM 118, and controls the intermittent reception controller 110 based on the read-out information so that the radio receiver 104 is turned on with a certain margin, i.e., somewhat before the frame to be received (usually, frames are grouped so as to be associated with respective batches). For example, if the CPU 111 sets values indicating "the 95th word in the batch immediately preceding the batch to be received" for the comparator 205 (see FIG. 3), the comparator 205 generates an interruption to the CPU 111 through a signal $S_{19}$ when all the count values $S_{14}$–$S_{17}$ coincide with the set values. Upon reception of this interruption, the CPU 111 controls the intermittent reception controller 110 to turn on the radio receiver 104.

When the CPU 111 receives an interruption of sync signal detection in the frame to be received while causing the radio receiver 104 to perform the second scanning or locking intermittent operation, it then receives data relating to the network information and the frame information from the decoder 109. If there is no problem in the error detection result of the frame information and the frame information coincides with the value of the frame to be received which is set in the ID-ROM 118, and if there is no problem in the error detection result of the network information, the CPU 111 compares the network information with the network value of the self receiver which is set in the ID-ROM 118, to check whether they are identical. This operation and the subsequent operations of the receiver will be described later in detail, because they constitute the features of the invention.

Further, when the CPU 111 is informed of detection of the self calling number from the decoder 109 while processing reception data of the ID number code, it then receives the corresponding message data from the decoder 109 and stores it into the RAM 117 after subjecting it to predetermined character conversion. The CPU 111 also controls a notification driver 114 to cause a speaker 115 to generate sound (i.e., effect notification) and, at the same time, controls a display driver 112 to display the received message.

INTERMITTENT RECEIVING METHODS

FIGS. 11–14 show respective receiving methods according to four embodiments directed to a case where the base station 101 transmits signals of the format as shown in FIG. 4 on a plurality of channels in a synchronization manner as shown in FIG. 9 while changing the order of transmission batch numbers for each channel within one subsequence. These process flows are executed by the CPU 111, and their programs are written in the ROM 116.

FIRST EMBODIMENT

Figure 11:
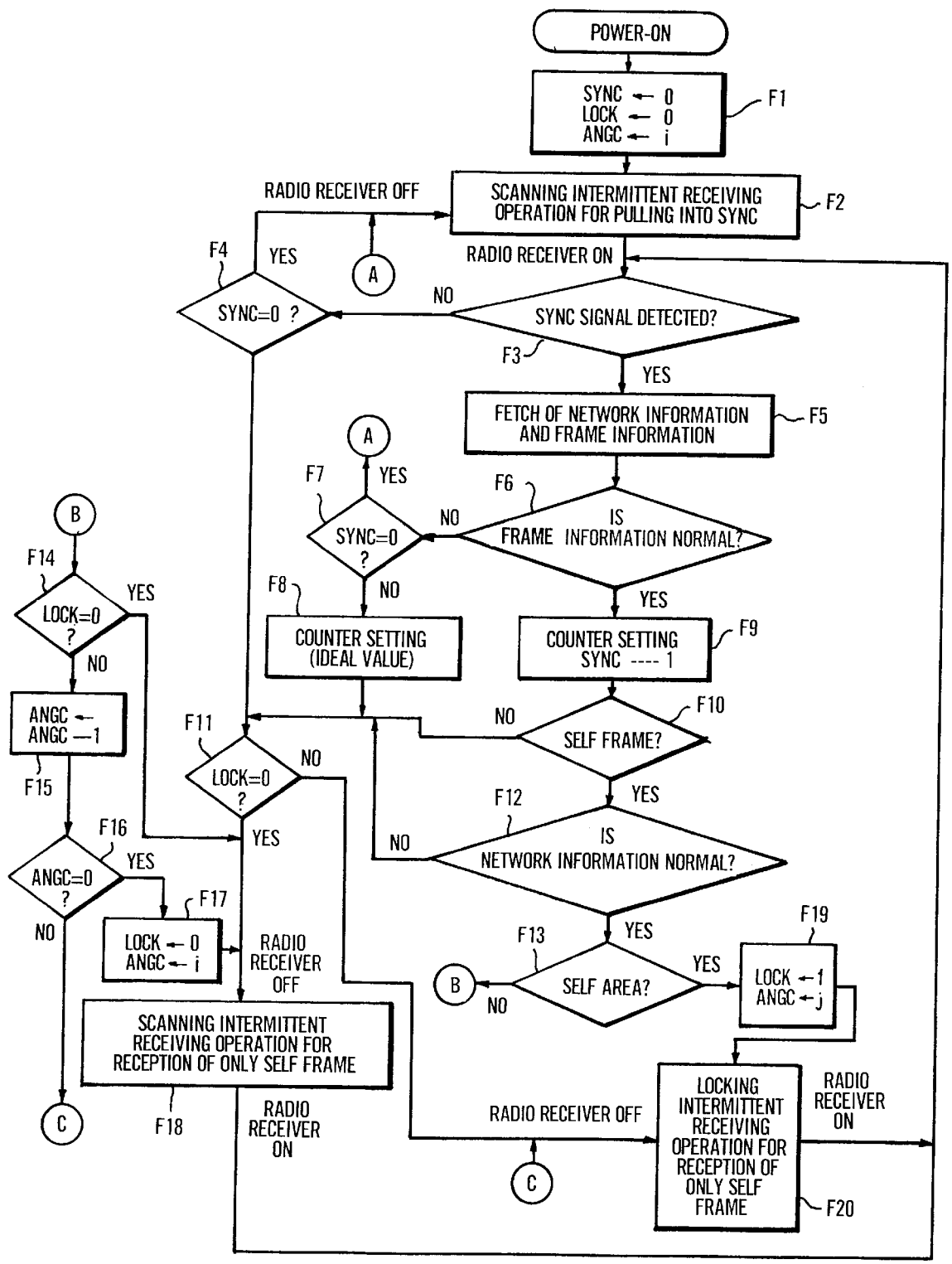
FIG. 11 is a flowchart showing a process flow according to a first embodiment of the invention.

Referring to FIG. 11, after the power-on, a frame sync flag SYNC is set at 0 (non-synchronization state), a channel control flag LOCK is set at 0 (scanning state), and the permissible number of times the area information is not identical (hereinafter called an area information non-coincidence number ANGC) is initialized to a predetermined value i that is stored in the ID-ROM 118 in advance (step F1). Then, the first scanning intermittent receiving operation as shown in FIG. 7 is started for pulling into synchronization (step F2). If the frame sync signal is detected (Yes at step F3) during this operation for pulling into synchronization, ensuing transmission network information and frame information are fetched (step F5) and the frame information is checked to find an error and a range (step F6). If the frame information is found erroneous or out of range (No at step F6), the above operation is performed again from the pulling into synchronization.

If the frame information is not found erroneous nor out of range (Yes at step F6), the frame sync flag SYNC is set at 1 (synchronization state) and the frame counter section 108 is set based on the fetched frame information value (step F9). For example, if a transmission batch number 0 is detected on channel #0, a value of 0 is set in the batch counter 202 (see FIG. 9). If a transmission batch number 0 is detected on channel #8, a value of 4 is set in the batch counter 202. If a transmission batch number 0 is detected on channel #1, a value of 11 is set in the batch counter 202. Thus, even in the state that the frame counter 108 is in synchronization with the transmission frame, the corresponding relationship between the transmission batch number and the value of the batch counter 202 in the receiver varies depending on the channel; they coincide with each other only in the case of channel #0.

After the frame sync flag SYNC is set at 1 (synchronization state) and the frame counter section 108 is set based on the fetched frame information value (step F9), the frame information received is compared with the value of the frame to be received by the self receiver which is stored in the ID-ROM 118 to check whether they are identical (step F10).

If they do not coincide with each other (No at step F10), the second scanning intermittent receiving operation (step F18) is performed to effect reception only in the frame to be received on each channel (see FIG. 9) in accordance with the previously set values of the frame counter section 108. On the other hand, if they coincide with each other (Yes at step F10), it is judged whether the fetched network information is correct (step F12).

If an error is found (No at step F12), the second scanning intermittent receiving operation (step F18) is performed to effect reception only in the frame to be received on each channel. If no error is found in the network information (Yes at step F12), the network information is compared with the network value (only the area information in FIG. 11) of the self receiver which is set in the ID-ROM 118 in advance to check whether they are identical (step F13).

If they do not coincide with each other (No at step F13), the second scanning intermittent receiving operation (step F18) is performed to effect reception only in the frame to be received on each channel, because LOCK=0 at step F14.

On the other hand, if they coincide with each other (Yes at step F13), the channel control flag LOCK is set at 1 (channel lock state), and the area information non-coincidence number ANGC is initialized (step F19). Then, the locking intermittent receiving operation (step F20) is performed to receive only the frame to be received on the channel of the current reception.

During the second scanning intermittent receiving operation (step F18) for reception of only the frame to be received on each channel or during the locking intermittent receiving operation (step F20) for reception of only the frame to be received on a fixed channel, if a frame sync signal is detected (Yes at step F3) but fetched frame information is not normal (No at step F6), since the SYNC=1 (No at step F7), a value that is determined based on the ideal value of the frame information which should have been received in a correct case (step F8) is set to maintain the synchronization (No at step F11, step 20).

During the locking intermittent receiving operation (step F20; channel control flag LOCK=1) for reception of only the frame to be received on a fixed channel, if a frame sync signal is detected (Yes at step F3), and frame information subsequently fetched is normal (Yes at step F6) and coincides with the value of the frame to be received by the self receiver which is stored in the ID-ROM 118 (Yes at step F10), and if fetched network information is normal (Yes at step F12) but does not coincide with the area information of the self receiver which is stored in the ID-ROM 118 (No at step F13), the area information non-coincidence number ANGC is decremented by one (step F15) and the locking intermittent receiving operation (step F20) is continued until ANGC becomes 0 due to continuous occurrence of the above state (No at step F16).

When ANGC becomes 0 (Yes at step F16), the channel control flag LOCK is set at 0 (scanning state) and ANGC is initialized (step F17). Then, the channel lock state is canceled and the process enters the second scanning intermittent receiving operation (step F18) for reception of only the frame to be received on each channel.

SECOND EMBODIMENT

In the second embodiment, both the area information and the frequency code of received network information are checked. If either of them is not identical consecutively at the predetermined number of times, the channel lock is released. It should be noted that each element of the network information may be checked in the same manner.

Figure 12:
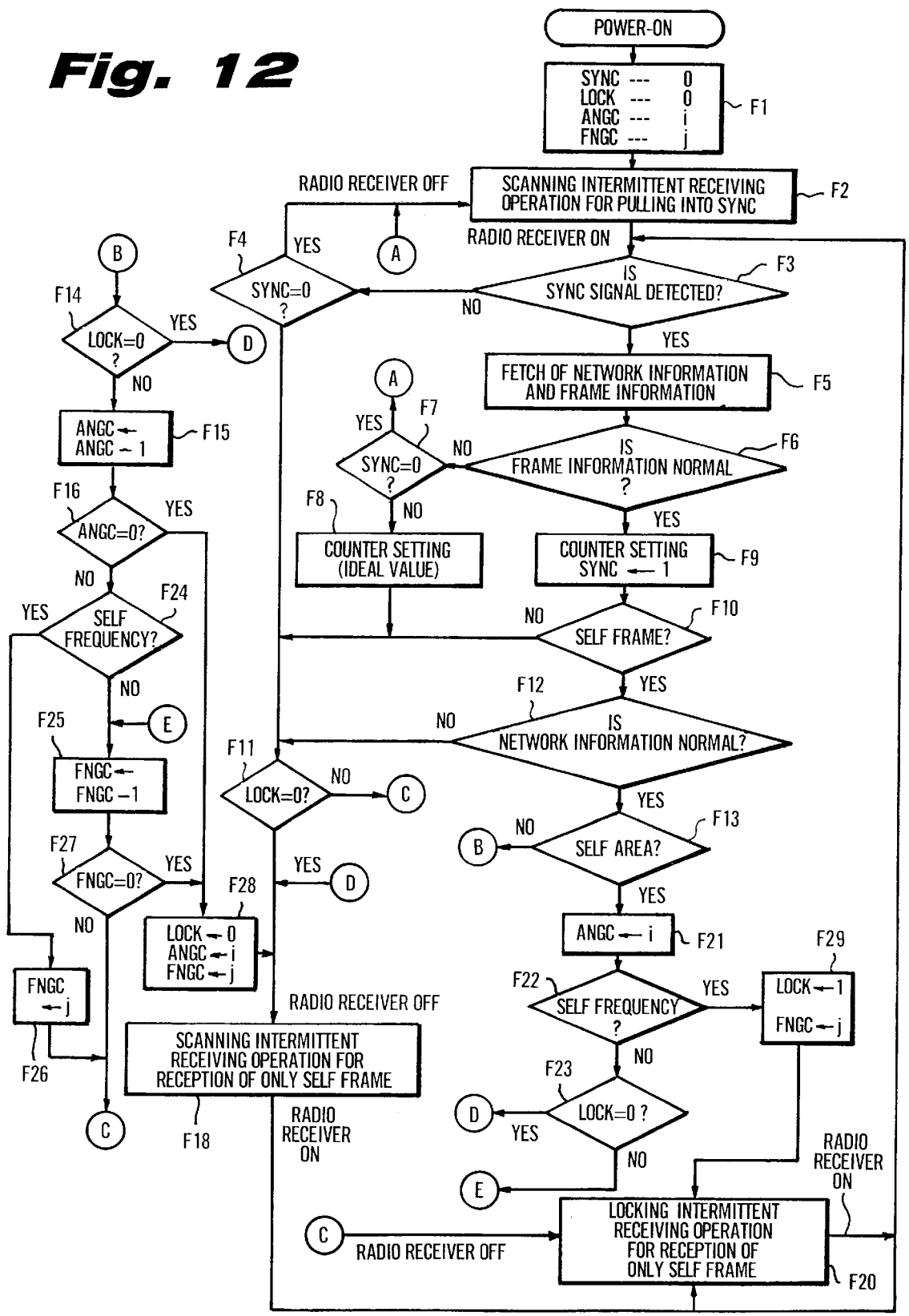
FIG. 12 is a flowchart showing a process flow according to a second embodiment of the invention.

Referring to FIG. 12, at step F1 of the second embodiment, the frame sync flag SYNC, the channel control flag LOCK, the area information non-coincidence number ANGC, and the allowable number of times the frequency code is not coincident (hereinafter called a frequency code non-coincidence number FNGC) are initialized to 0, 0, i, and j, respectively. Since steps F2–F16 shown in FIG. 12 are the same as those in FIG. 11, they are not described here.

The process flow of FIG. 12 is different from that of FIG. 11 in the following point. That is, during the locking intermittent receiving operation (step F20), if network information is received normally (Yes at step F12) and if area information is judged different from the value to be received consecutively at the predetermined number of times (i times in this embodiment), that is, in the case of "Yes" at step F16, or the frequency code is judged different from the value to be received consecutively at the predetermined number of times (j times in this embodiment), that is, in the case of "Yes" at step F27, then the channel lock is canceled and the process enters the second scanning intermittent receiving operation (step F18) for reception of only the frame to be received on each channel.

More specifically, when the received area information coincides with the area information of the self receiver which is set in the ID-ROM 118 (Yes at step F13), the area information non-coincidence number ANGC is initialized (step 21) and further it is checked whether the received frequency code is identical to the frequency value of the self receiver which is set in the ID-ROM 118 (step F22). If they are identical (Yes at step F22), the channel control flag LOCK is set at 1 (channel lock state), and the frequency code non-coincidence number FNGC is initialized (step F29). Then, the locking intermittent receiving operation (step F20) is performed.

On the other hand, If they are not identical (No at step F22), it is further checked whether LOCK is 0 (step F23). If LOCK is 0 (Yes at step F23), then the second intermittent receiving operation (step F18) is performed. If LOCK is 1 (Yes at step F23), then the frequency code non-coincidence number FNGC is decremented (step F25), and the locking intermittent receiving operation (step F20) is continued until FNGC becomes 0 (No at step F27). When FNGC becomes 0 (Yes at step F27), LOCK is set to 0, and ANGC and FNGC are initialized (step S28) before the second intermittent receiving operation (step F18) is performed.

Similarly, when ANGC does not become 0 after the step F15 (No at step F16), it is checked whether the received frequency code is identical to the frequency value of the self receiver which is set in the ID-ROM 118 (step F24). If they is not identical (No at step F24), then the frequency code non-coincidence number FNGC is decremented (step F25), and the steps following the step F25 are performed as described above. If they are identical (Yes at step F24), then the frequency code non-coincidence number FNGC is initialized (step F26), and the locking intermittent receiving operation (step F20) is performed.

When ANGC becomes 0 after the step F15 (Yes at step F16), LOCK is set to 0, and ANGC and FNGC are initialized (step S28) before the second intermittent receiving operation (step F18) is performed.

Similarly, it is possible to set each of elements including the area code and the frequency code of the network information to a permissible non-coincidence number of times. If either of them is not identical consecutively at the predetermined number of times, the channel lock is released.

THIRD EMBODIMENT

In the third embodiment, if the same area information of received network information is not identical to the area information of the self receiver consecutively at the predetermined number of times, the channel lock is released.

Figure 13:
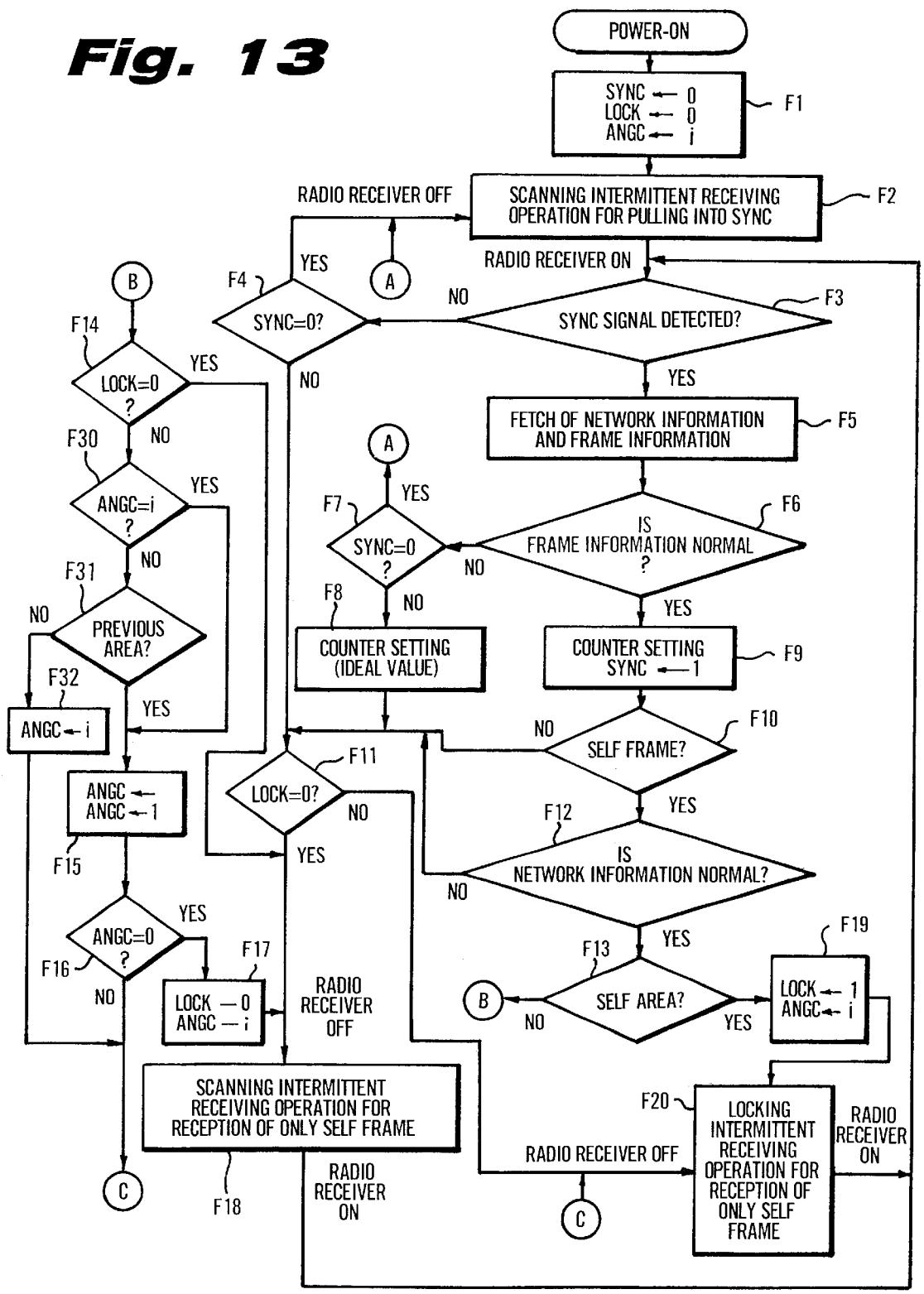
FIG. 13 is a flowchart showing a process flow according to a third embodiment of the invention.

Referring to FIG. 13, since steps F1–F20 are the same as those in FIG. 11, they are not described here. The process flow of FIG. 13 is different from that of FIG. 11 in the following point. During the locking intermittent receiving operation (step F20), if network information is received normally (Yes at step F12), it is judged different from the area information of the self receiver which is set in the ID-ROM 118 in advance consecutively at the predetermined number of times (i times in this embodiment), and the received network information (i.e., area information) remains the same while the above judgments are made (always Yes at step F31), the channel lock is released (step F17) and then the process enters the second scanning intermittent receiving operation (step F18) for reception of only the frame to be received on each channel.

More specifically, during the locking intermittent receiving operation (step F20), if the area information of received network information is not identical to that of the self receiver (No at step F13), after the CPU 111 stores that area information onto the RAM 117, it is further checked whether LOCK is 0 (step F14). Since LOCK is 1 in this case (channel lock state), subsequently it is checked whether ANGC is the initial value (step F30). If non-coincidence of area information occurs for the first time (Yes at step F30), ANGC is decremented (step F15) and the locking intermittent receiving (F20) is continued until ANGC becomes 0, as described in FIG. 11. If ANGC is not the initial value (No at step F30), the CPU 111 compares the current area information with the previous area information (step F31). If these area information is identical (Yes at step F31), ANGC is decremented (step F15) and then the locking intermittent receiving (F20) is continued until ANGC becomes 0, as described in FIG. 11. On the other hand, if the current area information is new (No at step F31), ANGC is initialized (step F32) and the locking intermittent receiving (F20) is continued.

FOURTH EMBODIMENT

In the fourth embodiment, both the same area information and the same frequency code of received network information are checked. If either of them is not identical consecutively at the predetermined number of times, the channel lock is released.

Figure 14:
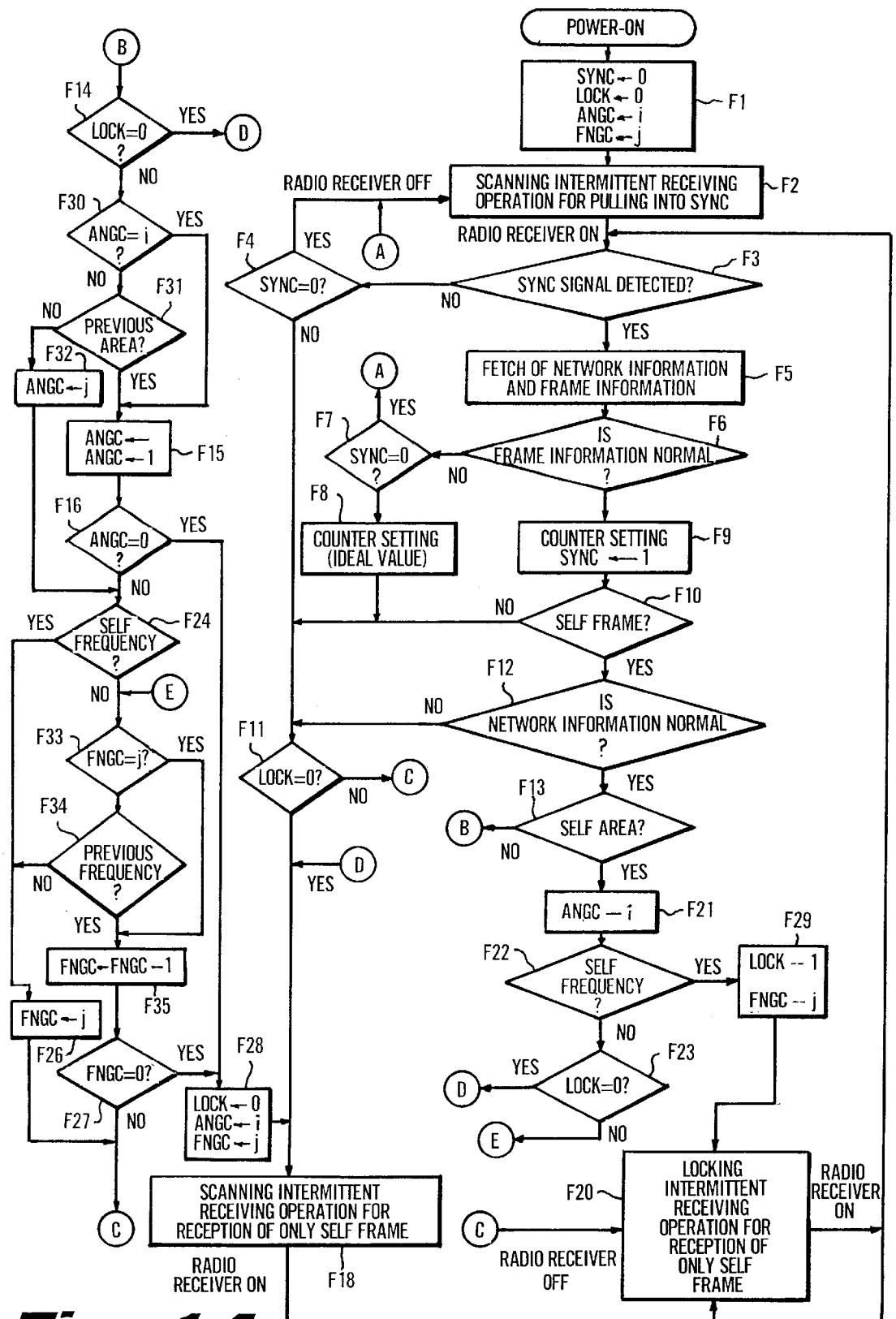
FIG. 14 is a flowchart showing a process flow according to a fourth embodiment of the invention.

Referring to FIG. 14, the process flow is different from that of FIGS. 12 and 13 in the following point. The channel lock is released and the process enters the second scanning intermittent receiving operation (step F18) when either of the following two conditions is satisfied during the locking intermittent receiving operation (step F20). The first condition is such that network information is received normally (Yes at step F12), area information in the received network information is judged different from the area information of the self receiver which is set in the ID-ROM 118 in advance consecutively at the predetermined number of times (i times in this embodiment), and the received area information remains the same while the above judgments are made (Yes at step F31). The second condition is such that network information is received normally (Yes at step F12), frequency information is judged different from the frequency information to be received by the self receiver which is set in the ID-ROM 118 in advance consecutively at the predetermined number of times (j times in this embodiment), and the received frequency information remains the same while the above judgments are made (always Yes at step F34).

Similarly, it is possible to set each of elements including the area code and the frequency code of the network information to a permissible non-coincidence number of times. If either of them is not identical consecutively at the predetermined number of times, the channel lock is released.

In each of the first to fourth embodiments of the invention as described above, it is preferable that an area where to display an antenna mark (e.g. ▽) is provided in the display 113. During the first scanning intermittent receiving operation for pulling into synchronization, the CPU 111 controls the display driver 112 to turn off the antenna mark in the display 113. Similarly, during the second scanning intermittent receiving operation for receiving only the frame to be received on each channel, the CPU 111 causes the antenna mark to blink. Further, during the locking intermittent receiving operation for receiving only the frame to be received on a fixed receiving channel, the CPU 111 turns on the antenna mark. In this manner, the current intermittent receiving state of the receiver is visually displayed to its user.

FIGS. 15–18 show respective process flows of the CPU 111 according to four embodiments directed to a case where the base station 101 transmits signals of the format as shown in FIG. 4 in burst mode (i.e., asynchronous), that is, without a frame information signal on a plurality of channels in a non-synchronization manner. Since synchronization is not taken among the respective channels, naturally the second scanning intermittent receiving operation (step F18) shown in FIGS. 11–14 does not exist in the embodiments of FIGS. 15–18. To simplify the description, in FIGS. 15–18, the steps similar to the corresponding steps in FIGS. 11–14 are given the same reference symbols and descriptions therefor are omitted.

FIFTH EMBODIMENT

Figure 15:
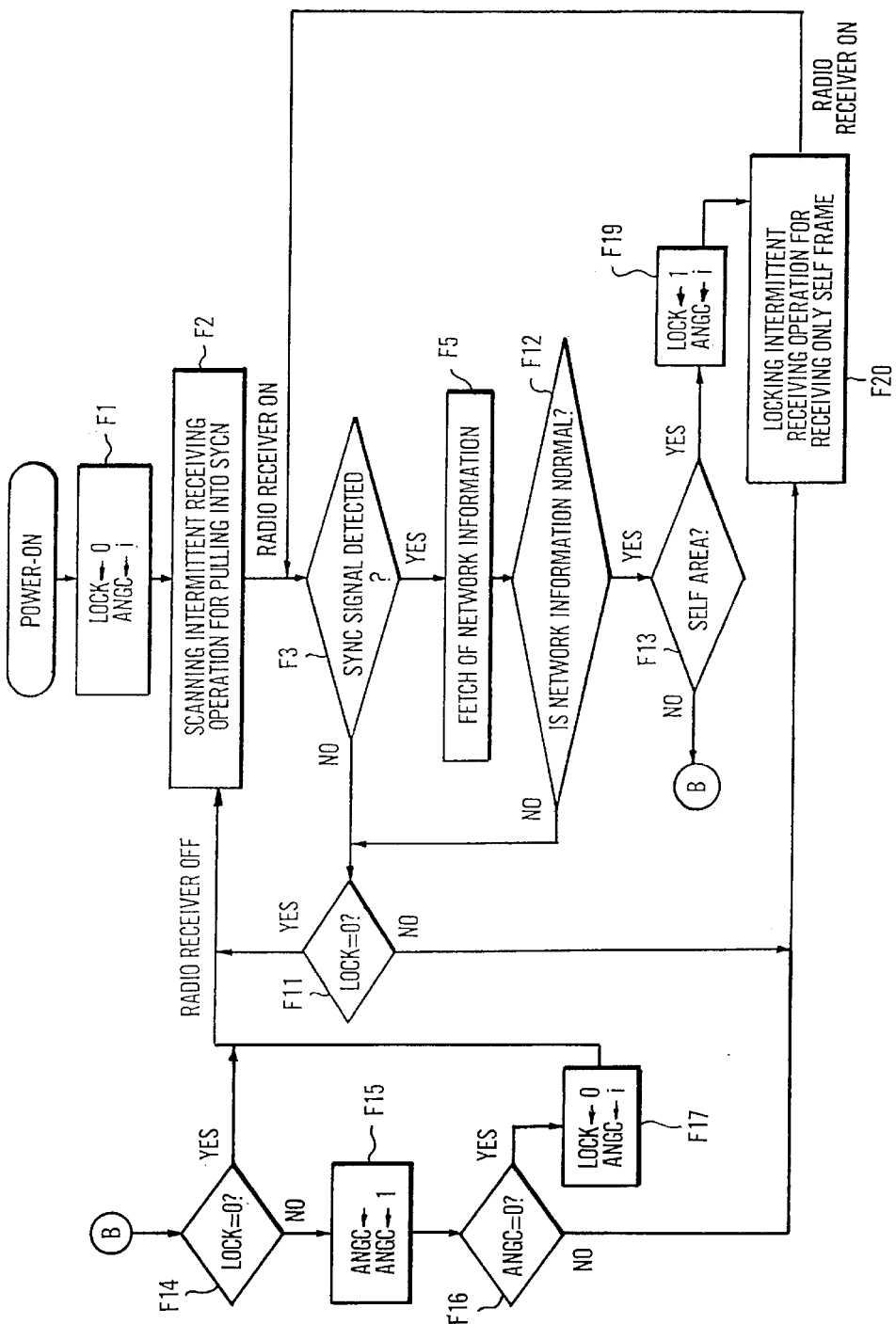
FIG. 15 is a flowchart showing a process flow according to a fifth embodiment of the invention.

Referring to FIG. 15, the process flow is different from that of FIG. 11 in the following point. That is, during the locking intermittent receiving operation (step F20), if network information is received normally (Yes at step F12), and it is judged different from the area information of the self receiver which is set in the ID-ROM 118 in advance consecutively at the predetermined number of times (i times in this embodiment; Yes at step F16), the channel lock is released and the process enters the first scanning intermittent receiving operation (step F2) for pulling into synchronization.

SIXTH EMBODIMENT

Figure 16:
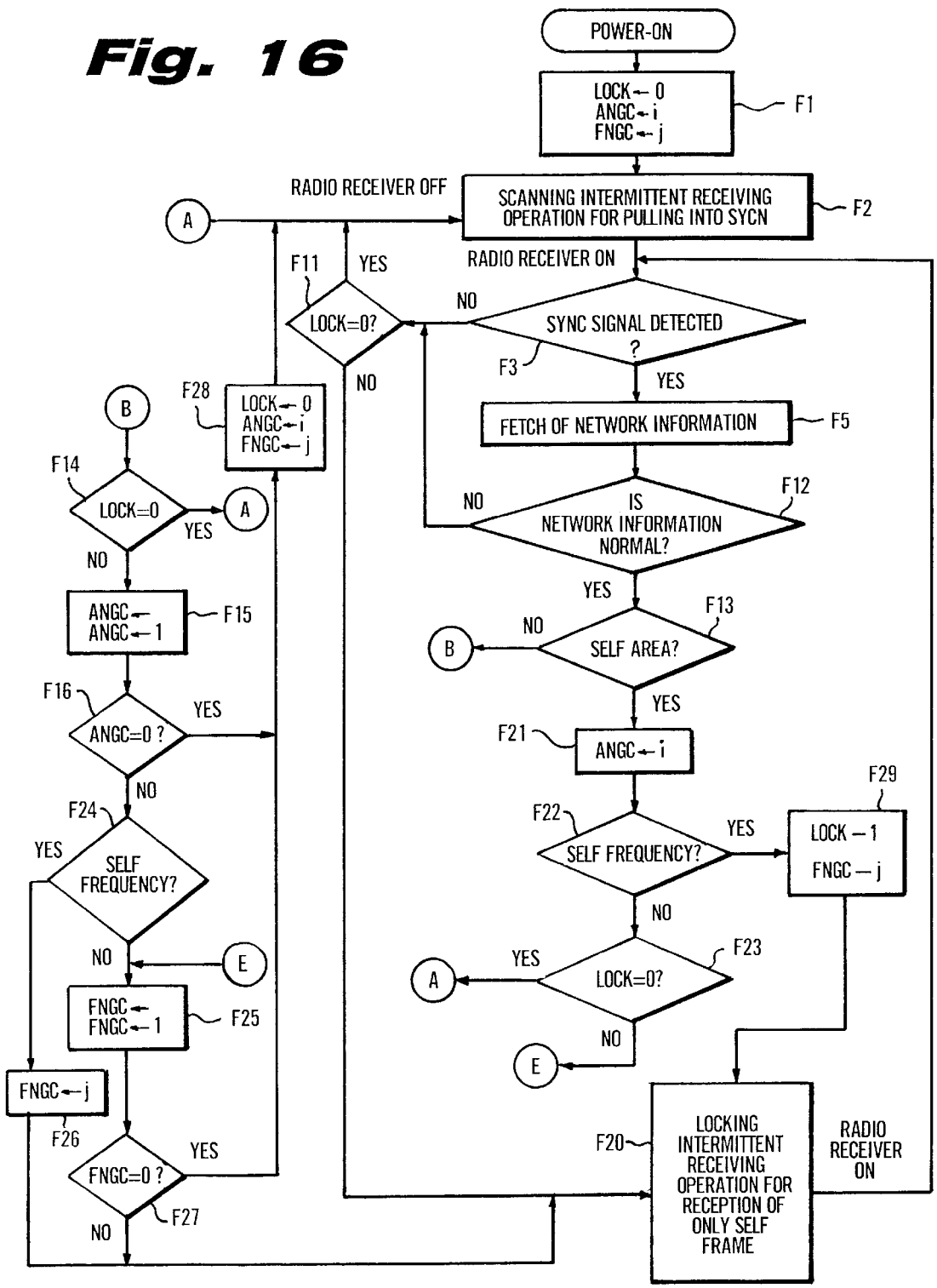
FIG. 16 is a flowchart showing a process flow according to a sixth embodiment of the invention.

Referring to FIG. 16, the process flow is different from that of FIG. 12 in the following point. That is, during the locking intermittent receiving operation (step F20), if network information is received normally (Yes at step F12), and if area information is judged different from the value to be received consecutively at the predetermined number of times (i times in this embodiment; Yes at step F16) or frequency information is judged different from the value to be received consecutively at the predetermined number of times (j times in this embodiment; Yes at step F27), the channel lock is released and the process enters the first scanning intermittent receiving operation (step F2) for pulling into synchronization.

SEVENTH EMBODIMENT

Figure 17:
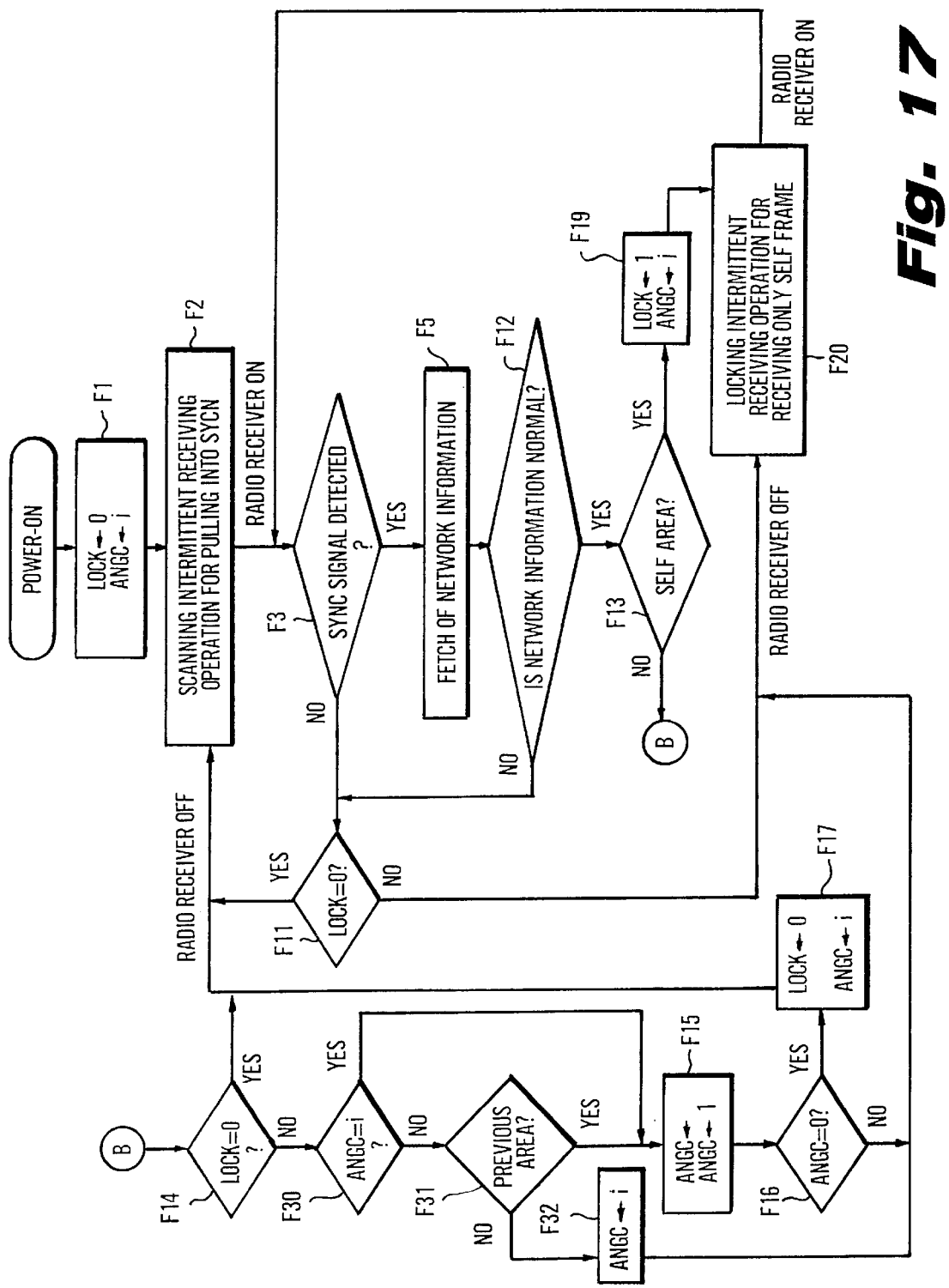
FIG. 17 is a flowchart showing a process flow according to a seventh embodiment of the invention.

Referring to FIG. 17, the process flow is different from that of FIG. 13 in the following point. That is, during the locking intermittent receiving operation (step F20), if network information is received normally (Yes at step F12), it is judged different from the area information of the self receiver which is set in the ID-ROM 118 in advance consecutively at the predetermined number of times (i times in this embodiment), and the received network information (i.e., area information) remains the same while the above judgments are made (always Yes at step F31), the channel lock is released and the process enters the first scanning intermittent receiving operation (step F2) for pulling into synchronization.

EIGHTH EMBODIMENT

Figure 18:
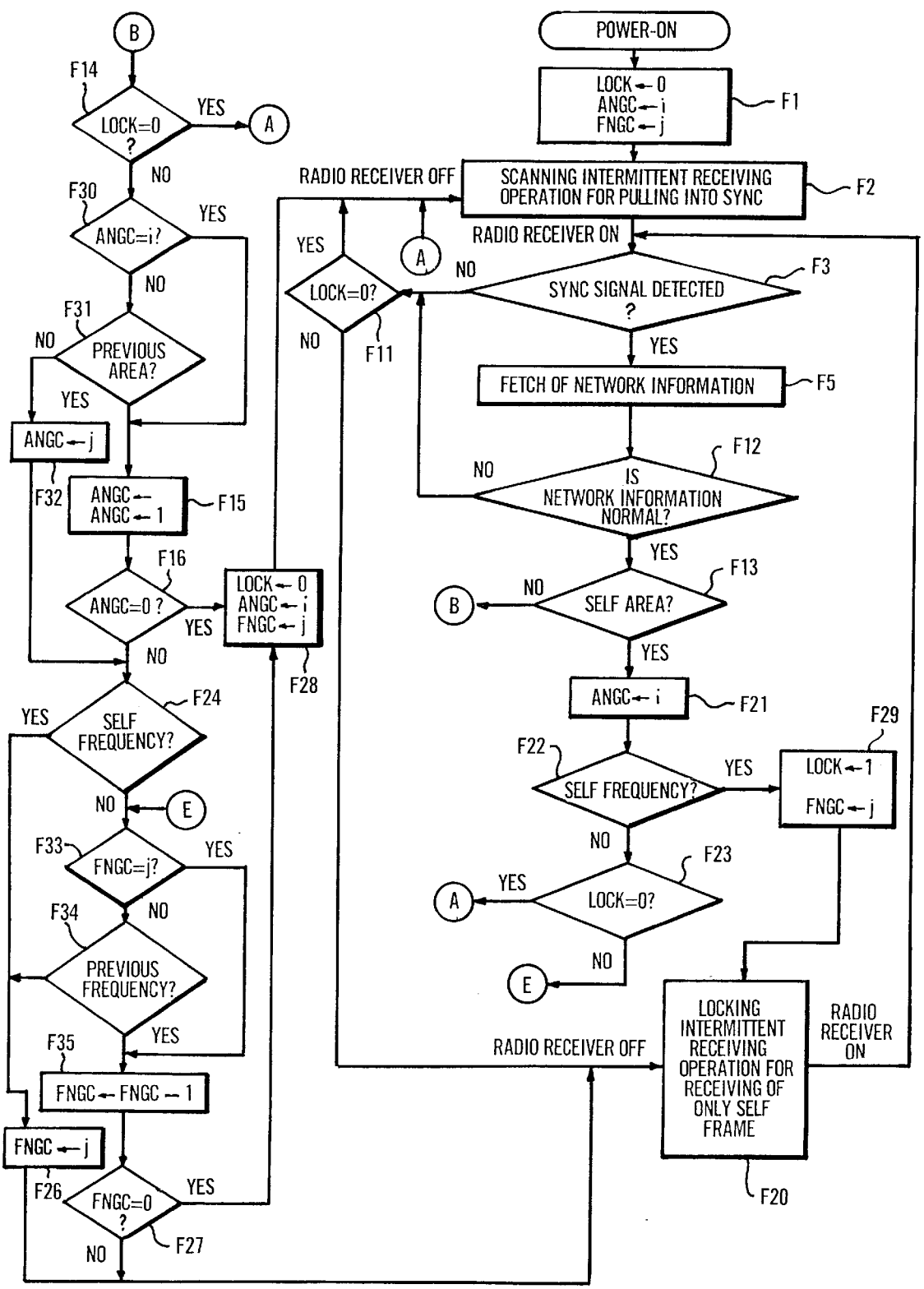
FIG. 18 is a flowchart showing a process flow according to an eighth embodiment of the invention.

Referring to FIG. 18, the process flow is different from that of FIG. 14 in the following point. That is, the channel lock is canceled and the process enters the first scanning intermittent receiving operation (step F2) for pulling into synchronization when either of the following two conditions is satisfied during the locking intermittent receiving operation (step F20). The first condition is such that network information is received normally (Yes at step F12), area information in the received network information is judged different from the area information of the self receiver which is set in the ID-ROM 118 in advance consecutively at the predetermined number of times (i times in this embodiment), and the received area information remains the same while the above judgments are made (always Yes at step F31). The second condition is such that network information is received normally (Yes at step F12), frequency information is judged different from the frequency information to be received by the self receiver which is set in the ID-ROM 118 in advance consecutively at the predetermined number of times (j times in this embodiment), and the received frequency information remains the same while the above judgments are made (always Yes at step F34).

As described above, according to the invention, during the intermittent receiving operation in a channel lock state, the channel lock is not immediately released even in case where, after a frame sync signal is detected, network information is detected normally and it is judged different from the network information of the self receiver. More specifically, the channel lock is released to allow the other channels to be scanned when non-coincidence of the network information of the self receiver is found consecutively at a predetermined number of times. Alternatively, the channel lock is released when the non-coincidence is found consecutively at the predetermined number of times and the received network information remains the same value while such judgments are made. Therefore, there can be prevented a problem that, when the sensitivity of the receiver falls due to sudden occurrence of noise or temporary entrance into an area of poor reception of radio waves, the channel lock is easily released to start scanning the other channels, resulting in a waste of battery current. There can also be prevented a problem that should locking be made to another channel erroneously (for instance, due to accidental conversion into incorrect reception data) while the other channels are scanned, it is not possible to receive data on the network channel of the self receiver next time.

In addition, visually displaying whether a current intermittent receiving operation of the receiver is being performed while the channels are scanned or in a channel lock state helps a user of the receiver judge whether his receiver is consuming the battery energy at a high rate.

What is claimed is:

1. A method for releasing a frequency channel lock in a wireless selective calling receiver which intermittently receives a transmission signal by selecting one of a plurality of frequency channels, the transmission signal having service identifying information including a service identifier at a predetermined position of the transmission signal, the method comprising the steps of:
    a) storing the service identifying information including the service identifier;
    b) comparing a detected signal which is detected from the predetermined position of each of received signals with the service identifier stored;
    c) counting a number of consecutive non-coincidences of the service identifier and detected signals which are detected from the predetermined position of consecutively received signals to produce a non-coincidence count; and
    d) releasing the frequency channel lock when the non-coincidence count reaches a predetermined value.

2. The method according to claim 1, wherein the service identifying information comprises a plurality of service identifiers at predetermined positions of the transmission signal, respectively.

3. The method according to claim 2, further comprising the step of storing predetermined values corresponding to each of the service identifiers, wherein
    the step (c) comprises the step of counting a number of consecutive non-coincidences of each of the service identifiers and detected signals which are detected from the predetermined position of consecutively received signals to produce non-coincidence counts corresponding to the service identifiers, respectively, and
    the step (d) comprises the step of releasing the frequency channel lock when at least one of the non-coincidence counts reaches a predetermined value.

4. The method according to claim 1, further comprising the steps of:
    comparing the detected signal with a preceding detected signal which was detected from the predetermined position of a preceding received signal; and
    detecting consecutive coincidences of the detected signal and the preceding detected signal,
    wherein the step (c) comprises the step of counting a number of consecutive non-coincidences of the service identifier and detected signals which are detected from the predetermined position of consecutively received signals with the detected signals remaining the same to produce the non-coincidence count.

5. The method according to claim 4, wherein the service identifying information comprises a plurality of service identifiers at predetermined positions of the transmission signal, respectively.

6. The method according to claim 5, further comprising the step of storing predetermined values corresponding to each of the service identifiers, wherein
    the step (c) comprises the step of counting a number of consecutive non-coincidences of each of the service identifiers and detected signals which are detected from the predetermined position of consecutively received signals with the detected signals remaining the same to produce non-coincidence counts corresponding to the service identifiers, respectively, and
    the step (d) comprises the step of releasing the frequency channel lock when at least one of the non-coincidence counts reaches a predetermined value.

7. The method according to claim 1, further comprising the step of:
    intermittently receiving the transmission signal while scanning the frequency channels in a predetermined order after the frequency channel lock is released.

8. The method according to claim 1, wherein a base station transmits the transmission signal on each of the frequency channels in synchronous transmission.

9. The method according to claim 3, wherein a base station transmits the transmission signal on each of the frequency channels in synchronous transmission.

10. The method according to claim 4, wherein a base station transmits the transmission signal on each of the frequency channels in a synchronous transmission.

11. The method according to claim 6, wherein a base station transmits the transmission signal on each of the frequency channels in a synchronous transmission.

12. The method according to claim 1, wherein a base station transmits the transmission signal on each of the frequency channels in asynchronous transmission.

13. The method according to claim 3, wherein a base station transmits the transmission signal on each of the frequency channels in asynchronous transmission.

14. The method according to claim 4, wherein a base station transmits the transmission signal on each of the frequency channels in asynchronous transmission.

15. The method according to claim 6, wherein a base station transmits the transmission signal on each of the frequency channels in asynchronous transmission.

16. The method according to claim 1, wherein the transmission signal has a predetermined format comprising a synchronization, the service identifying information, frame identifying information, an selective calling number, and a message.

17. The method according to claim 1, wherein the service identifier is a frequency code.

18. The method according to claim 1, wherein the service identifier is an area code.

19. A system for releasing a frequency channel lock in a wireless selective calling receiver which intermittently receives a transmission signal by selecting one of a plurality of frequency channels, the transmission signal having service identifying information including a service identifier at a predetermined position of the transmission signal, the system comprising:
   storage means for storing the service identifying information including the service identifier;
   comparing means for comparing a detected signal which is detected from the predetermined position of each of received signals with the service identifier stored;
   counting means for counting a number of consecutive non-coincidences of the service identifier and detected signals which are detected from the predetermined position of consecutively received signals to produce a non-coincidence count; and
   channel control means for releasing the frequency channel lock when the non-coincidence count reaches a predetermined value.

20. The system according to claim 19, wherein the service identifying information comprises a plurality of service identifiers at predetermined positions of the transmission signal, respectively.

21. The system according to claim 20, wherein the storage means further stores predetermined values corresponding to each of the service identifiers, wherein
   the counting means counts a number of consecutive non-coincidences of each of the service identifiers and detected signals which are detected from the predetermined position of consecutively received signals to produce non-coincidence counts corresponding to the service identifiers, respectively, and
   the channel control means releases the frequency channel lock when at least one of the non-coincidence counts reaches a predetermined value.

22. The system according to claim 19, further comprising:
   second comparing means for comparing the detected signal with a preceding detected signal which was detected from the predetermined position of a preceding received signal; and
   detecting means for detecting consecutive coincidences of the detected signal and the preceding detected signal,
   wherein the counting means for counting a number of consecutive non-coincidences of the service identifier and detected signals which are detected from the predetermined position of consecutively received signals with the detected signals remaining the same to produce the non-coincidence count.

23. The system according to claim 22, wherein the service identifying information comprises a plurality of service identifiers at predetermined positions of the transmission signal, respectively.

24. The system according to claim 23, wherein the storage means further stores predetermined values corresponding to each of the service identifiers, wherein
   the counting means counts a number of consecutive non-coincidences of each of the service identifiers and detected signals which are detected from the predetermined position of consecutively received signals with the detected signals remaining the same to produce non-coincidence counts corresponding to the service identifiers, respectively, and
   the channel control means releases the frequency channel lock when at least one of the non-coincidence counts reaches a predetermined value.

25. The system according to claim 19, wherein the channel control means scans the frequency channels in a predetermined order to intermittently receive the transmission signal after the frequency channel lock is released.

26. The system according to claim 19, wherein a base station transmits the transmission signal on each of the frequency channels in synchronous transmission.

27. The system according to claim 19, wherein a base station transmits the transmission signal on each of the frequency channels in asynchronous transmission.

28. A wireless selective calling receiver for intermittently receiving a transmission signal by selecting one of a plurality of frequency channels, the transmission signal having a frame synchronization signal, a service identifying information signal including a service identifier, and a frame identifying information signal at predetermined positions of the transmission signal, respectively, and the transmission signal being transmitted from a base station on the frequency channels in synchronous transmission, the receiver comprising:
   a first detector for detecting the frame synchronization signal from a received signal;
   a second detector for detecting the service identifying information signal from the received signal;
   a third detector for detecting the frame identifying information signal from the received signal;
   frame synchronization means for maintaining synchronization with the received signal when the third detector detects the frame identifying information signal normally;
   storage means for storing the service identifying information including the service identifier;
   comparing means for comparing a detected signal which is detected from the predetermined position of each of received signals with the service identifier stored;
   counting means for counting a number of consecutive non-coincidences of the service identifier and detected signals which are detected from the predetermined position of consecutively received signals to produce a non-coincidence count; and
   intermittent receiving control means performing
      a first intermittent receiving operation for pulling into synchronization while sequentially changing the frequency channels until the third detector detects the frame identifying information signal normally after the first detector detects the frame synchronization signal,
      a second intermittent receiving operation at a predetermined frame position in each frequency channel while sequentially changing the frequency channels until the detected signal is coincident with the service identifier stored after the first detector detects the frame synchronization signal and the third detector detects the frame identifying information signal normally, a third intermittent receiving operation at a predetermined frame position in a single frequency channel which is locked when the detected signal is coincident with the service identifier stored during the second intermittent receiving operation, and the third intermittent receiving operation is canceled and the second intermittent receiving operation is started when the non-coincidence count reaches a predetermined value.

29. The receiver according to claim 28, wherein the service identifying information comprises a plurality of service identifiers at predetermined positions of the transmission signal, respectively.

30. The receiver according to claim 29, wherein the storage means further stores predetermined values corresponding to each of the service identifiers, wherein the counting means counts a number of consecutive non-coincidences of each of the service identifiers and detected signals which are detected from the predetermined position of consecutively received signals to produce non-coincidence counts corresponding to the service identifiers, respectively, and the intermittent receiving control means cancels the third intermittent receiving operation when at least one of the non-coincidence counts reaches a predetermined value.

31. The receiver according to claim 28, further comprising:

second comparing means for comparing the detected signal with a preceding detected signal which was detected from the predetermined position of a preceding received signal; and detecting means for detecting consecutive coincidences of the detected signal and the preceding detected signal, wherein the counting means for counting a number of consecutive non-coincidences of the service identifier and detected signals which are detected from the predetermined position of consecutively received signals with the detected signals remaining the same to produce the non-coincidence count.

32. The receiver according to claim 31, wherein the service identifying information comprises a plurality of service identifiers at predetermined positions of the transmission signal, respectively.

33. The receiver according to claim 32, wherein the storage means further stores predetermined values corresponding to each of the service identifiers, wherein the counting means counts a number of consecutive non-coincidences of each of the service identifiers and detected signals which are detected from the predetermined position of consecutively received signals with the detected signals remaining the same to produce non-coincidence counts corresponding to the service identifiers, respectively, and the intermittent receiving control means cancels the third intermittent receiving operation when at least one of the non-coincidence counts reaches a predetermined value.

34. A wireless selective calling receiver for intermittently receiving a transmission signal by selecting one of a plurality of frequency channels, the transmission signal having a frame synchronization signal, a service identifying information signal including a service identifier, and a frame identifying information signal at predetermined positions of the transmission signal, respectively, and the transmission signal being transmitted from a base station on the frequency channels in asynchronous transmission, the receiver comprising:

a first detector for detecting the frame synchronization signal from a received signal;

a second detector for detecting the service identifying information signal from the received signal;

a third detector for detecting the frame identifying information signal from the received signal;

storage means for storing the service identifying information including the service identifier;

comparing means for comparing a detected signal which is detected from the predetermined position of each of received signals with the service identifier stored;

counting means for counting a number of consecutive non-coincidences of the service identifier and detected signals which are detected from the predetermined position of consecutively received signals to produce a non-coincidence count; and intermittent receiving control means performing a first intermittent receiving operation for pulling into synchronization while sequentially changing the frequency channels until the detected signal is coincident with the service identifier stored after the first detector detects the frame synchronization signal, a second intermittent receiving operation at a predetermined frame position in a single frequency channel which is locked when the detected signal is coincident with the service identifier stored during the first intermittent receiving operation, and the second intermittent receiving operation is canceled and the first intermittent receiving operation is started when the non-coincidence count reaches a predetermined value.

35. A method for intermittently receiving a transmission signal by selecting one of a plurality of frequency channels, the transmission signal having a frame synchronization signal, a service identifying information signal including a service identifier, and a frame identifying information signal at predetermined positions of the transmission signal, respectively, and the transmission signal being transmitted from a base station on the frequency channels in synchronous transmission, the method comprising the steps of:

detecting the frame synchronization signal from a received signal;

detecting the service identifying information signal from the received signal;

detecting the frame identifying information signal from the received signal;

maintaining synchronization with the received signal when the third detector detects the frame identifying information signal normally;

storing the service identifying information including the service identifier;

comparing a detected signal which is detected from the predetermined position of each of received signals with the service identifier stored;

counting a number of consecutive non-coincidences of the service identifier and detected signals which are detected from the predetermined position of consecutively received signals to produce a non-coincidence count;

performing a first intermittent receiving operation for pulling into synchronization while sequentially changing the frequency channels until the third detector detects the frame identifying information signal normally after the frame synchronization signal is detected;

performing a second intermittent receiving operation at a predetermined frame position in each frequency channel while sequentially changing the frequency channels until the detected signal is coincident with the service identifier stored after the frame synchronization signal is detected and the frame identifying information signal is detected normally;

performing a third intermittent receiving operation at a predetermined frame position in a single frequency channel which is locked when the detected signal is coincident with the service identifier stored during the second intermittent receiving operation; and canceling the third intermittent receiving operation when the non-coincidence count reaches a predetermined value to start the second intermittent receiving operation.

36. The method according to claim 35, wherein the service identifying information comprises a plurality of service identifiers at predetermined positions of the transmission signal, respectively.

37. The method according to claim 36, further comprising the step of storing predetermined values corresponding to each of the service identifiers, wherein the number of consecutive non-coincidences of each of the service identifiers and detected signals which are detected from the predetermined position of consecutively received signals is counted to produce non-coincidence counts corresponding to the service identifiers, respectively, and the third intermittent receiving operation is canceled when at least one of the non-coincidence counts reaches a predetermined value.

38. The receiver according to claim 35, further comprising the steps of:

comparing the detected signal with a preceding detected signal which was detected from the predetermined position of a preceding received signal; and detecting consecutive coincidences of the detected signal and the preceding detected signal, wherein the number of consecutive non-coincidences of the service identifier and detected signals is counted to produce the non-coincidence count, the detected signals being detected from the predetermined position of consecutively received signals with the detected signals remaining the same.

39. A method for intermittently receiving a transmission signal by selecting one of a plurality of frequency channels, the transmission signal having a frame synchronization signal, a service identifying information signal including a service identifier, and a frame identifying information signal at predetermined positions of the transmission signal, respectively, and the transmission signal being transmitted from a base station on the frequency channels in asynchronous transmission, the method comprising the steps of:

detecting the frame synchronization signal from a received signal;

detecting the service identifying information signal from the received signal;

detecting the frame identifying information signal from the received signal;

storing the service identifying information including the service identifier;

comparing a detected signal which is detected from the predetermined position of each of received signals with the service identifier stored;

counting a number of consecutive non-coincidences of the service identifier and detected signals which are detected from the predetermined position of consecutively received signals to produce a non-coincidence count;

performing a first intermittent receiving operation for pulling into synchronization while sequentially changing the frequency channels until the detected signal is coincident with the service identifier stored after the frame synchronization signal is detected;

performing a second intermittent receiving operation at a predetermined frame position in a single frequency channel which is locked when the detected signal is coincident with the service identifier stored during the first intermittent receiving operation; and canceling the second intermittent receiving operation when the non-coincidence count reaches a predetermined value to start the first intermittent receiving operation.

40. The receiver according to claim 28, further comprising:

displaying means provided in the receiver; and control means for controlling the display such that a visual mark is displayed on the displaying means in a different manner determined depending on which one of the first intermittent receiving operation, the second intermittent receiving operation, and the third intermittent receiving operation is performed.

41. The method according to claim 35, further comprising the step of displaying a visual mark in a different manner determined depending on which one of the first intermittent receiving operation, the second intermittent receiving operation, and the third intermittent receiving operation is performed.

* * * * *